United States Patent
Sugaya et al.

(10) Patent No.: US 12,457,060 B2
(45) Date of Patent: Oct. 28, 2025

(54) WIRELESS COMMUNICATION DEVICE AND METHOD, AND WIRELESS COMMUNICATION TERMINAL AND METHOD

(71) Applicant: SONY GROUP CORPORATION, Tokyo (JP)

(72) Inventors: Shigeru Sugaya, Tokyo (JP); Kosuke Aio, Tokyo (JP)

(73) Assignee: SONY GROUP CORPORATION, Tokyo (JP)

(*) Notice: Subject to any disclaimer, the term of this patent is extended or adjusted under 35 U.S.C. 154(b) by 720 days.

(21) Appl. No.: 17/619,806

(22) PCT Filed: Jun. 10, 2020

(86) PCT No.: PCT/JP2020/022788
§ 371 (c)(1),
(2) Date: Dec. 16, 2021

(87) PCT Pub. No.: WO2020/261988
PCT Pub. Date: Dec. 30, 2020

(65) Prior Publication Data
US 2022/0353018 A1    Nov. 3, 2022

(30) Foreign Application Priority Data
Jun. 24, 2019  (JP) .................. 2019-116317

(51) Int. Cl.
*H04L 1/18*   (2023.01)
*H04L 5/00*   (2006.01)

(52) U.S. Cl.
CPC ............. *H04L 1/18* (2013.01); *H04L 5/0055* (2013.01)

(58) Field of Classification Search
None
See application file for complete search history.

(56) References Cited

U.S. PATENT DOCUMENTS 9,998,944 B2   6/2018  Wang
2004/0063455 A1*  4/2004  Eran .................... H04W 92/20
                                                     455/525
(Continued)

FOREIGN PATENT DOCUMENTS

JP    2012-160854 A    8/2012
JP    2017-011486 A    1/2017
(Continued)

OTHER PUBLICATIONS

International Search Report and Written Opinion of PCT Application No. PCT/JP2020/022788, issued on Aug. 18, 2020, 09 pages of ISRWO.

*Primary Examiner* — Hassan A Phillips
*Assistant Examiner* — Gautam Sharma
(74) *Attorney, Agent, or Firm* — CHIP LAW GROUP

(57) ABSTRACT

The present technology relates to a wireless communication device and method, and a wireless communication terminal and method that enable a plurality of access points to efficiently collect receipt acknowledgments of data from respective communication terminals. The wireless communication device coordinately transmits, with one or more first other wireless communication devices, data addressed to the wireless communication terminals each including information indicating a transmission timing of a receipt acknowledgment of each of the plurality of wireless communication terminals. Furthermore, the wireless communication device receives the receipt acknowledgment from each of the wireless communication terminals after transmitting the data. The present technology can be applied to a wireless communication system.

18 Claims, 27 Drawing Sheets

(56) References Cited

U.S. PATENT DOCUMENTS

| | | | |
|---|---|---|---|
| 2005/0141548 A1* | 6/2005 | Koo | H04W 72/569 370/462 |
| 2005/0254471 A1* | 11/2005 | Zhang | H04W 84/18 370/349 |
| 2006/0029028 A1* | 2/2006 | Kim | H04W 84/12 370/338 |
| 2006/0048034 A1 | 3/2006 | Cho | |
| 2006/0092960 A1* | 5/2006 | Lee | H04L 1/1845 370/412 |
| 2006/0282309 A1* | 12/2006 | Zhang | G06Q 30/02 705/14.1 |
| 2007/0160040 A1* | 7/2007 | Kwon | H04W 8/04 370/389 |
| 2007/0174835 A1* | 7/2007 | Xu | G06F 9/4416 717/176 |
| 2008/0277909 A1* | 11/2008 | Matsuda | B60R 21/017 280/735 |
| 2010/0202347 A1 | 8/2010 | Sridhara | |
| 2013/0051293 A1 | 2/2013 | Wentink | |
| 2013/0100952 A1 | 4/2013 | Hart | |
| 2014/0328333 A1 | 11/2014 | Seo et al. | |
| 2014/0376478 A1 | 12/2014 | Morita | |
| 2016/0149671 A1* | 5/2016 | Yang | H04L 1/1621 370/216 |
| 2019/0068255 A1* | 2/2019 | Bolotin | H04L 1/0003 |
| 2019/0116018 A1* | 4/2019 | Aboul-Magd | H04L 5/14 |
| 2020/0021400 A1* | 1/2020 | Cherian | H04L 5/0055 |
| 2022/0209825 A1* | 6/2022 | Chitrakar | H04W 28/02 |
| 2022/0294567 A1* | 9/2022 | Sugaya | H04L 1/1864 |

FOREIGN PATENT DOCUMENTS

| | | |
|---|---|---|
| TW | 201818780 A | 5/2018 |
| WO | 2013/077633 A1 | 5/2013 |
| WO | 2013/108901 A1 | 7/2013 |
| WO | WO-2017193376 A1 | 11/2017 |

* cited by examiner

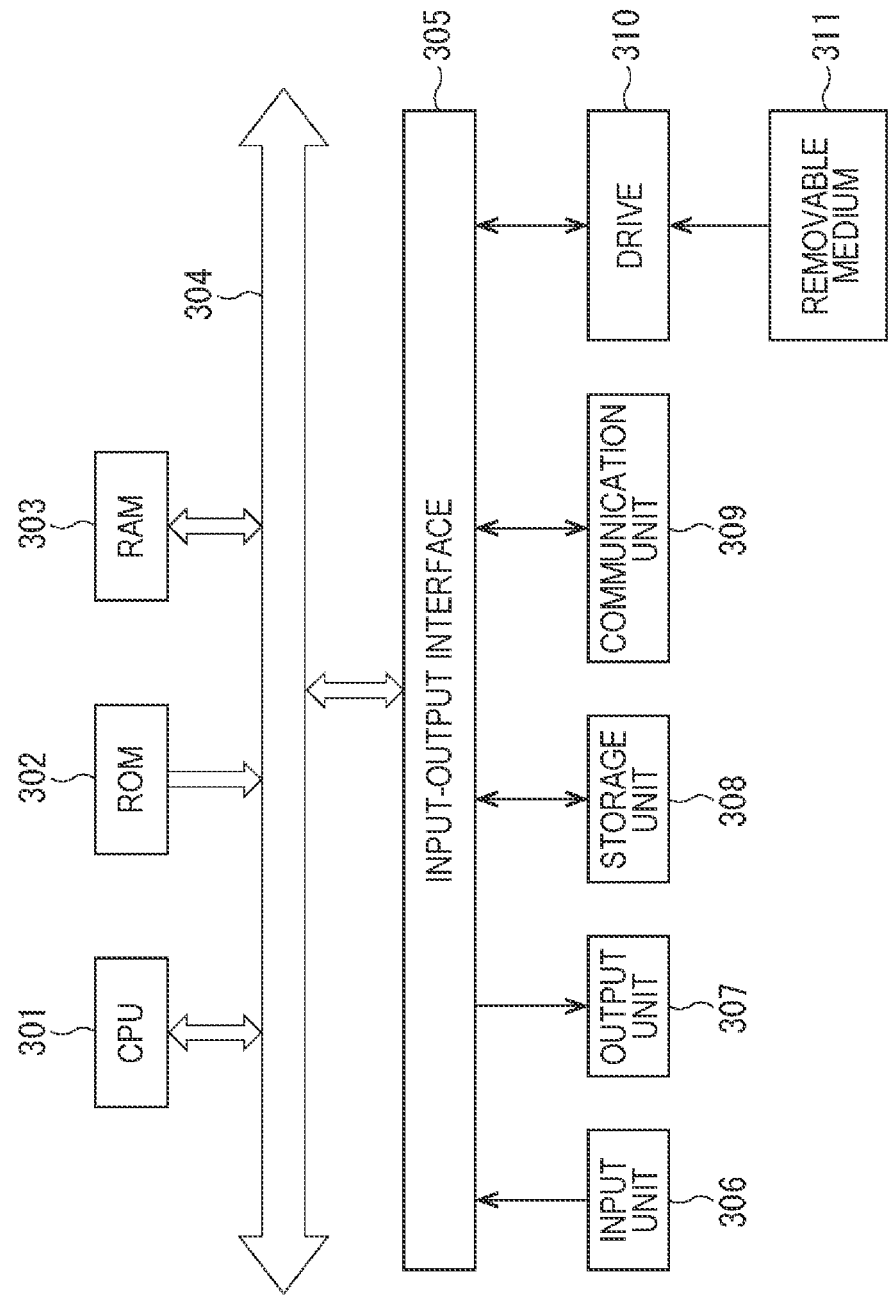

WIRELESS COMMUNICATION DEVICE AND METHOD, AND WIRELESS COMMUNICATION TERMINAL AND METHOD

CROSS REFERENCE TO RELATED APPLICATIONS

This application is a U.S. National Phase of International Patent Application No. PCT/JP2020/022788 filed on Jun. 10, 2020, which claims priority benefit of Japanese Patent Application No. JP 2019-116317 filed in the Japan Patent Office on Jun. 24, 2019. Each of the above-referenced applications is hereby incorporated herein by reference in its entirety.

TECHNICAL FIELD

The present technology relates to a wireless communication device and method, and a wireless communication terminal and method, and more particularly relates to a wireless communication device and method, and a wireless communication terminal and method that enable a plurality of access points to efficiently collect receipt acknowledgments of data from respective communication terminals.

BACKGROUND ART

A technique for more reliably transmitting data in a wireless LAN system has been proposed. The technique is a technique of transmitting identical data to one communication terminal (STA) from a plurality of base stations (access points (APs)) whose operations are coordinated.

Patent Document 1 discloses a technique of constructing data including a field signal including information designating a stream and transmitting the data to each STA in a case where a plurality of APs simultaneously transmits the identical data at the same frequency.

CITATION LIST

Patent Document

Patent Document 1: Japanese Patent Application Laid-Open No. 2017-011486

SUMMARY OF THE INVENTION

Problems to be Solved by the Invention

In a case where the identical data is simultaneously transmitted from the plurality of APs to one STA as described above, it has been difficult for the STA to determine which AP a receipt acknowledgment (ACK) should be returned to.

Furthermore, in a case where any AP among the plurality of APs fails to receive the receipt acknowledgment transmitted from the STA, it has been possible that retransmission of data is started from the AP that fails to receive the receipt acknowledgment even though the STA has already received the data.

The present technology has been made in view of such a situation, and enables a plurality of APs to efficiently collect receipt acknowledgments of data from respective STAs.

Solutions to Problems

A wireless communication device according to one aspect of the present technology includes a wireless transmission unit that coordinately transmits data addressed to wireless communication terminals with one or more first other wireless communication devices and transmits information indicating a transmission timing of a receipt acknowledgment of each piece of the data to the wireless communication terminals, and a wireless reception unit that receives a receipt acknowledgment from each of the wireless communication terminals after transmitting the data.

In the one aspect of the present technology, data addressed to wireless communication terminals is coordinately transmitted with one or more first other wireless communication devices, information indicating a transmission timing of a receipt acknowledgment of each piece of the data is transmitted to the wireless communication terminals, and a receipt acknowledgment is received from each of the wireless communication terminals after transmitting the data.

A wireless communication terminal according to another aspect of the present technology includes a wireless reception unit that receives data coordinately transmitted from a plurality of wireless communication devices and information indicating a transmission timing of a receipt acknowledgment, a control unit that generates the receipt acknowledgment, and a wireless transmission unit that transmits the receipt acknowledgment at the transmission timing.

In the another aspect of the present technology, data coordinately transmitted from a plurality of wireless communication devices and information indicating a transmission timing of a receipt acknowledgment are received, the receipt acknowledgment is generated, and the receipt acknowledgment is transmitted at the transmission timing.

BRIEF DESCRIPTION OF DRAWINGS

FIG. 27 is a block diagram illustrating a configuration example of a computer.

MODE FOR CARRYING OUT THE INVENTION

Hereinafter, a mode for carrying out the present technology will be described. The description will be made in the following order.
 1. Wireless communication system
 2. Configuration of communication device
 3. Frame configuration
 4. Operation of communication device
 5. Others <<1. Wireless Communication System>>
<Configuration of Wireless Communication System>

Figure 1:
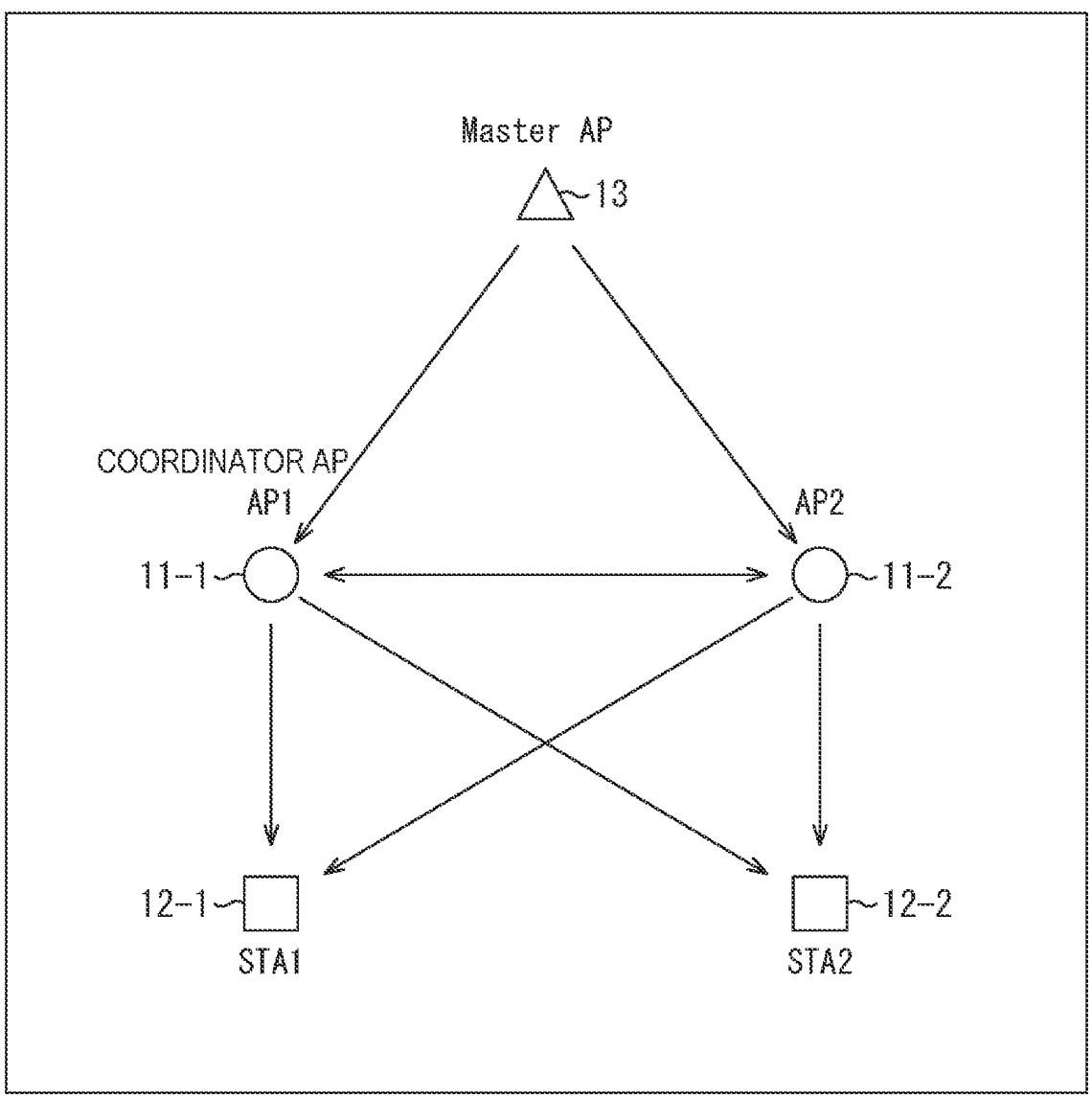
FIG. 1 is a diagram illustrating a configuration example of a wireless communication system to which the present technology is applied.

FIG. 1 is a diagram illustrating a configuration example of a wireless communication system according to an embodiment of the present technology.

The wireless communication system in FIG. 1 is configured by connecting a Master AP (access point) including a communication device 13, an AP 1 including a communication device 11-1, an AP 2 including a communication device 11-2, an STA 1 including a communication device 12-1, and an STA 2 including a communication device 12-2 by wireless communication.

Hereinafter, in a case where it is not necessary to distinguish the communication devices 11-1 and 11-2, they are simply referred to as communication devices 11. In a case where it is not necessary to distinguish the communication devices 12-1 and 12-2, they are simply referred to as communication devices 12. Note that details of the communication devices 11 to 13 will be described later.

In the wireless communication system of FIG. 1, there is a Master AP serving as a master that controls a plurality of APs. The Master AP is connected to the Internet via, for example, an external service provider. The Master AP is configured to deliver predetermined application data to the STA via each AP including an application device. That is, the Master AP functions as a gateway to the Internet.

In the wireless communication system, the Master AP is in a state of being connected to the AP 1 and the AP 2, and is in a connection relationship with the AP 1 and the AP 2. The STA 1 is in a state of being connected to the AP 1 and is in a connection relationship with the AP 1. The distance between the STA 1 and the AP 1 is shorter than the distance between the STA 1 and the AP 2. The STA 2 is in a state of being connected to the AP 2 and is in a connection relationship with the AP 2. The distance between the STA 2 and the AP 2 is shorter than the distance between the STA 2 and the AP 1.

The AP 1 and the AP 2 are in a communicable positional relationship with each other. Both the AP 1 and the STA 2 and the AP 2 and the STA 1 are in a positional relationship in which they can communicate with each other. Note that an AP having a connection relationship may also be referred to as an associate AP.

The wireless communication system is configured such that a plurality of APs receives a trigger frame for coordinate transmission transmitted from a Master AP, so that data is coordinately transmitted by the plurality of APs, which is a feature of the present technology.

The trigger frame for coordinate transmission is a frame including information indicating a trigger for performing the coordinate transmission. The coordinate transmission is a transmission method in which a plurality of APs transmits identical data to the same STA substantially simultaneously in a matched timing. To transmit substantially simultaneously in a matched timing means to transmit in coordinated operations.

Note that although only two APs are connected in the wireless communication system of FIG. 1, three or more APs may be connected.

The Master AP transmits data for performing coordinate transmission to the AP 1 and the AP 2. Furthermore, the Master AP transmits a trigger frame for coordinate transmission to the AP 1 and the AP 2. The trigger frame for coordinate transmission also includes information instructing an AP as a coordinator responsible for a role of controlling the coordinate transmission. In FIG. 1, the AP 1 will be described as the AP as the coordinator.

The AP 1 and the AP 2 coordinately transmit data to the STA 1 and the STA 2 on the basis of the trigger frame for coordinate transmission. The AP 1 and the AP 2 receive a receipt acknowledgment (ACK) addressed to the AP 1 transmitted from the STA 1 and a receipt acknowledgment addressed to the AP 2 transmitted from the STA 2, respectively. The AP 1 that is the coordinator specifies the retransmission data on the basis of the receipt acknowledgments addressed to the AP 1 and the AP 2. In a case where there is data to be retransmitted, the AP 1 transmits a trigger frame for retransmission including information indicating the retransmission data to the AP 2.

The AP 1 and the AP 2 coordinately transmit retransmission data on the basis of the trigger frame for retransmission. The AP 1 and the AP 2 receive the receipt acknowledgment (ACK) for the retransmission data addressed to the AP 1 transmitted from the STA 1 and the receipt acknowledgment for the retransmission data addressed to the AP 2 transmitted from the STA 2, respectively.

The AP 1 as the coordinator specifies the retransmission data on the basis of the receipt acknowledgments addressed to the AP 1 and the AP 2, and broadcasts an end frame indicating the end of a series of coordinate transmissions in a case where there is no data to be retransmitted. The AP 2 receives the end frame and recognizes the end of the coordinate transmission of the data.

The STA 1 and the STA 2 receive data transmitted from the AP 1 and the AP 2. The STA 1 and the STA 2 generate a receipt acknowledgment on the basis of the received data, and transmit the receipt acknowledgment to the AP (the AP 1 or the AP 2) having a connection relationship.

The STA 1 and the STA 2 receive retransmission data transmitted from the AP 1 and the AP 2. The STA 1 and the STA 2 generate a receipt acknowledgment on the basis of the received retransmission data and transmit the receipt acknowledgment to the AP having a connection relationship. The STA 1 and the STA 2 receive an end frame, and recognize the end of coordinate transmission of data.

With the above configuration, a plurality of APs can communicate with a plurality of STAs.

<Operation of Wireless Communication System>

Figure 2:
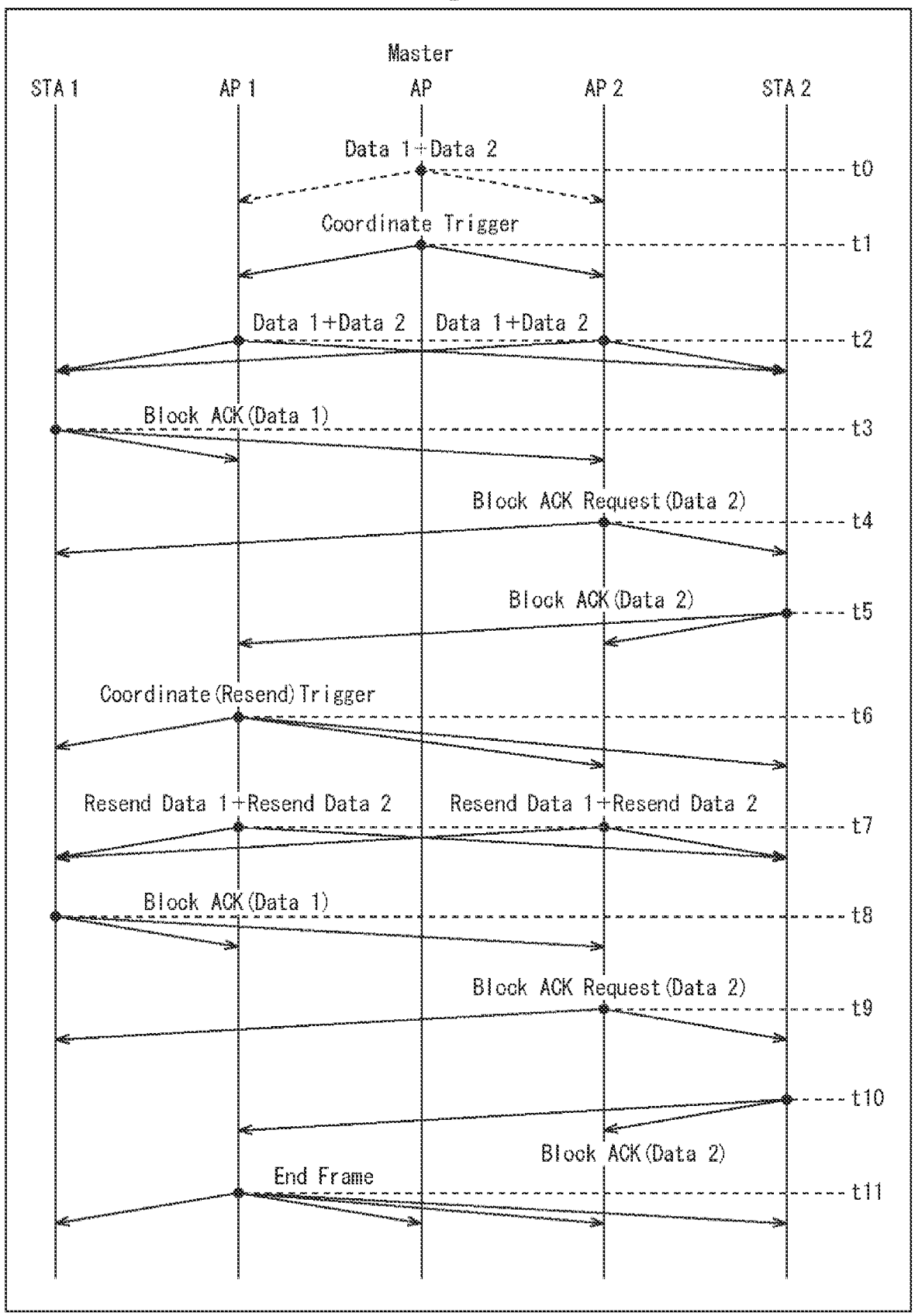
FIG. 2 is a diagram illustrating a communication sequence of coordinate transmission by the wireless communication system.

FIG. 2 is a diagram illustrating a communication sequence of coordinate transmission by the wireless communication system of FIG. 1.

FIG. 2 illustrates a sequence in which transmission and reception of a predetermined frame are performed and a series of data is delivered without errors in a case where each of the Master AP, the AP 1, the AP 2, the STA 1, and the STA 2 is present. That is, an operation is illustrated in which the Master AP connected to the Internet network collects data addressed to the STA 1 and the STA 2, and coordinately transmits data addressed to the plurality of STAs from the AP 1 and the AP 2 at the same timing.

Furthermore, FIG. 2 illustrates an example in which a specific STA returns a block ACK frame immediately after data transmission, and another STA returns the block ACK frame after receiving a block ACK request frame from the AP. Note that the transmission timing of the block ACK frame or the block ACK request frame is set by a BA Order described in a data frame as described later with reference to FIG. 16.

At time t0, the Master AP transmits data (Data 1+Data 2) to be coordinately transmitted to the AP 1 and the AP 2. Thus, the AP 1 and the AP 2 are in a state of sharing the Data 1 addressed to the STA 1 and the Data 2 addressed to the STA 2.

At time t1, the Master AP transmits a trigger frame for coordinate transmission (Coordinate Trigger) to the AP 1 and the AP 2. Thus, the AP 1 and the AP 2 are notified that the AP 1 and the AP 2 coordinately transmit data at a predetermined timing thereafter. Furthermore, for example, the AP 1 is instructed to operate as the AP as the coordinator.

At time t2 which is the predetermined timing, the AP 1 and the AP 2 coordinately transmit the Data 1 addressed to the STA 1 and the Data 2 addressed to the STA 2 on the basis of the trigger frame for coordinate transmission. Here, for example, for data addressed to the STA 1, a parameter is set so that the block ACK frame is returned at an immediately subsequent timing. Furthermore, for data addressed to the STA 2, a parameter is set so that the block ACK frame is returned after the block ACK request frame thereafter is received.

The STA 1 and the STA 2 receive the data transmitted from the AP 1 and the AP 2 without particularly distinguishing which AP the data is transmitted from. The STA 1 and the STA 2 generate information of the receipt acknowledgment on the basis of a reception result of data addressed to themselves.

Then, at time t3, which is an immediately subsequent timing, the STA 1 returns the block ACK frame addressed to the AP 1 having a connection relationship, as the receipt acknowledgment of the Data 1. The AP 1 receives the block ACK frame addressed to itself. The AP 2 receives the block ACK frame addressed to the AP 1 that performs coordinate transmission.

At time t4, the AP 2 having a connection relationship with the STA 2 transmits a block ACK request (BAR) frame addressed to the STA 2.

The STA 2 that has received the block ACK request transmits, on the basis of the BAR frame, the block ACK frame addressed to the AP 2 having a connection relationship as the receipt acknowledgment of the Data 2 at time t5, which is an immediately subsequent timing. The AP 1 receives the block ACK frame addressed to the AP 2 that performs coordinate transmission. The AP 2 receives the block ACK frame addressed to itself. Note that the block ACK frame includes the address of the AP 1 as the coordinator.

By receiving the block ACK frames addressed to the AP 1 and the AP 2, the AP 1 and the AP 2 can grasp the data reception statuses of the STA 1 and the STA 2. That is, each of the AP 1 and the AP 2 can specify data to be retransmitted.

At time t6, in a case where there is data to be retransmitted, the AP 1 as the coordinator transmits a trigger frame for retransmission (Coordinate Resend Trigger). The trigger frame for retransmission is received by each of the AP 2, the STA 1, and the STA 2. Thus, the AP 2, the STA 1, and the STA 2 can grasp the structure of the retransmission data.

At time t7 which is a predetermined timing, the AP 1 and the AP 2 coordinately transmit retransmission data (Resend Data 1) addressed to the STA 1 and retransmission data (Resend Data 2) addressed to the STA 2. Here, for example, for the retransmission data addressed to the STA 1, a parameter is set so that the block ACK frame is returned at an immediately subsequent timing. Furthermore, for the retransmission data addressed to the STA 2, a parameter is set so that the block ACK frame is returned after the block ACK request frame thereafter is received.

At time t8, which is the immediately subsequent timing, the STA 1 returns the block ACK frame addressed to the AP 1 as the receipt acknowledgment of the Resend Data 1.

At time t9, the AP 2 having the connection relationship with the STA 2 transmits the block ACK request (BAR) frame.

The AP 2 that has received the block ACK request returns, on the basis of the BAR frame, the block ACK frame addressed to the AP 2 as the receipt acknowledgment of the Resend Data 2, at time t10 which is the immediately subsequent timing.

By receiving the block ACK frames addressed to the AP 1 and the AP 2, the AP 1 and the AP 2 can grasp the data reception statuses of the STA 1 and the STA 2.

In a case where it can be confirmed that both the STA 1 and the STA 2 have successfully received all data, the AP 1 as the coordinator sends an end frame to the Master AP, the AP 2, the STA 1, and the STA 2 by broadcasting. The Master AP, the AP 2, the STA 1, and the STA 2 that have received the end frame can grasp the end of the sequence.

<Data Transmission and Reception in Wireless Communication System>

Figure 3:
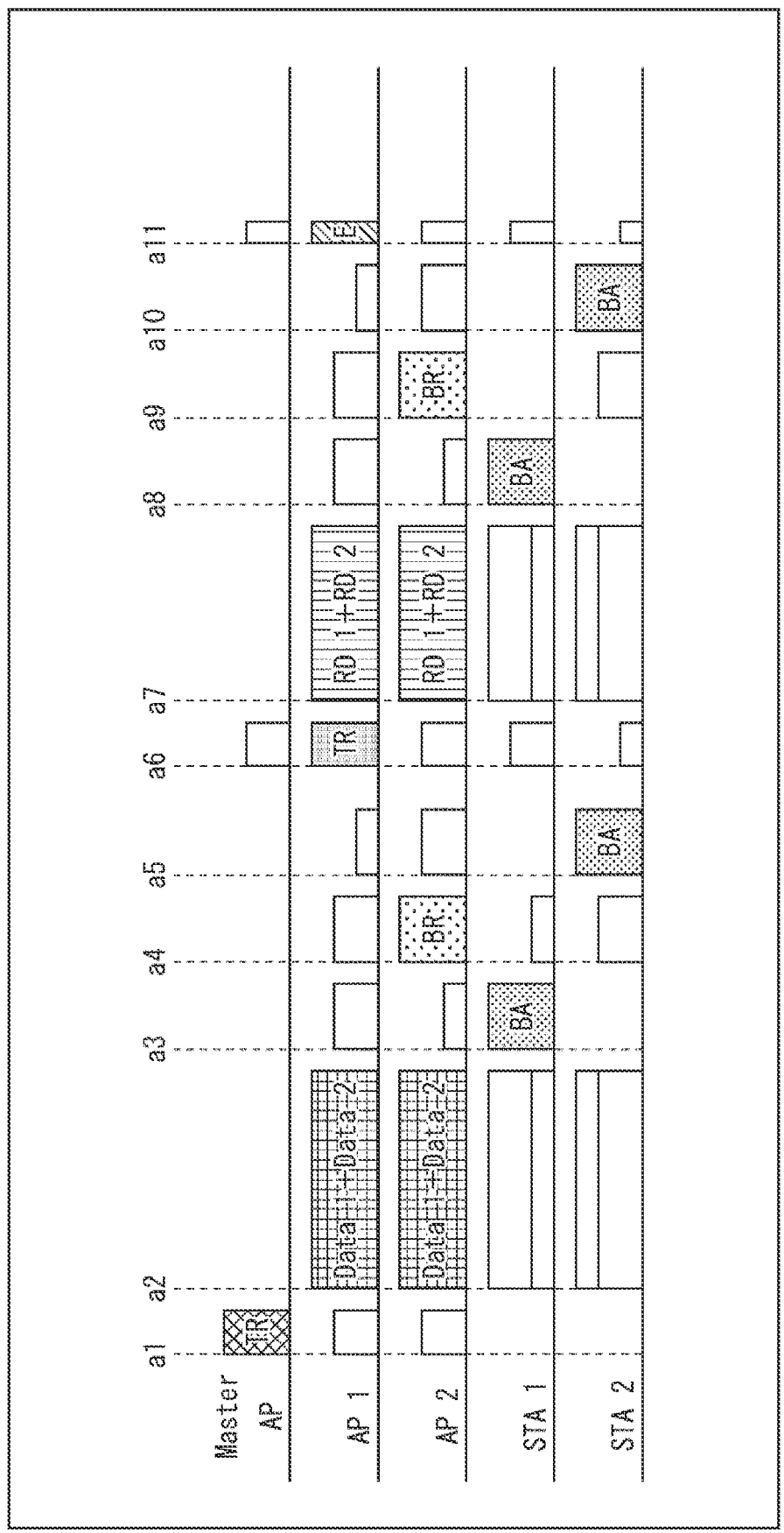
FIG. 3 is a diagram illustrating an example of data transmission and reception timings.

FIG. 3 is a diagram illustrating an example of data transmission and reception timings in the communication sequence of FIG. 2 of the wireless communication system of FIG. 1.

In FIG. 3, the horizontal axis represents time. Rectangles represent frames to be transmitted or received by the Master AP, the AP 1, the AP 2, the STA 1, and the STA 2.

Note that a frame to be transmitted is represented by a hatched rectangle. In FIG. 3, a frame to be received is represented by a rectangle having a height corresponding to reception field intensity for convenience. Furthermore, among the frames to be received, a frame to receive Data or Resend Data (RD) is divided into an upper portion and a lower portion for convenience, where the upper portion indicates a ratio of data transmitted from the AP 1 in the whole, and the lower portion indicates a ratio of data transmitted from the AP 2 in the whole. Indicating the ratio of the data specifically indicates that the coordinate transmission allows the data to be effectively received. The same applies to following drawings.

At time a1, the Master AP transmits a trigger (TR) frame for coordinate transmission. The AP 1 and the AP 2 receive the trigger (TR) frame for coordinate transmission transmitted from the Master AP.

At time a2, the AP 1 and the AP 2 coordinately transmit the Data 1 addressed to the STA 1 and the Data 2 addressed to the STA 2 on the basis of the trigger (TR) frame of the coordinate transmission.

At time a3, which is immediately after reception of the Data 1, the STA 1 returns a block ACK (BA) frame addressed to the AP 1 for the Data 1.

At time a4, the AP 2 having the connection relationship with the STA 2 transmits a block ACK request (BR) frame addressed to the STA 2.

At time a5, which is immediately after reception of the block ACK request (BR) frame, the STA 2 returns an ACK (BA) frame addressed to a block AP 2 for the Data 2. Thus, the block ACK (BA) frames addressed to all the APs are collected in the AP 1 and the AP 2.

At time a6, in a case where there is data to be retransmitted, the AP 1 transmits a trigger (TR) frame for retransmission.

At time a7, the AP 1 and the AP 2 coordinately transmit RD (Resend Data) 1 addressed to the STA 1 and RD 2 addressed to the STA 2 on the basis of the trigger (TR) frame for retransmission.

At time a8, which is immediately after reception of the RD 1, the STA 1 returns the block ACK (BA) frame addressed to the AP 1 for the RD 1.

At time a9, the AP 2 having the connection relationship with the STA 2 transmits the block ACK request (BR) frame addressed to the STA 2.

At time a10, which is immediately after reception of the block ACK request (BR) frame, the STA 2 returns the block ACK (BA) frame addressed to the AP 2 for the RD 2. Thus, the block ACK (BA) frames addressed to all the APs are collected in the AP 1 and the AP 2.

At time a11, the AP 1 transmits the end (E) frame by broadcasting. Thus, the Master AP, the AP 2, the STA 1, and the STA 2 grasp the end of the coordinate transmission.

Figure 4:
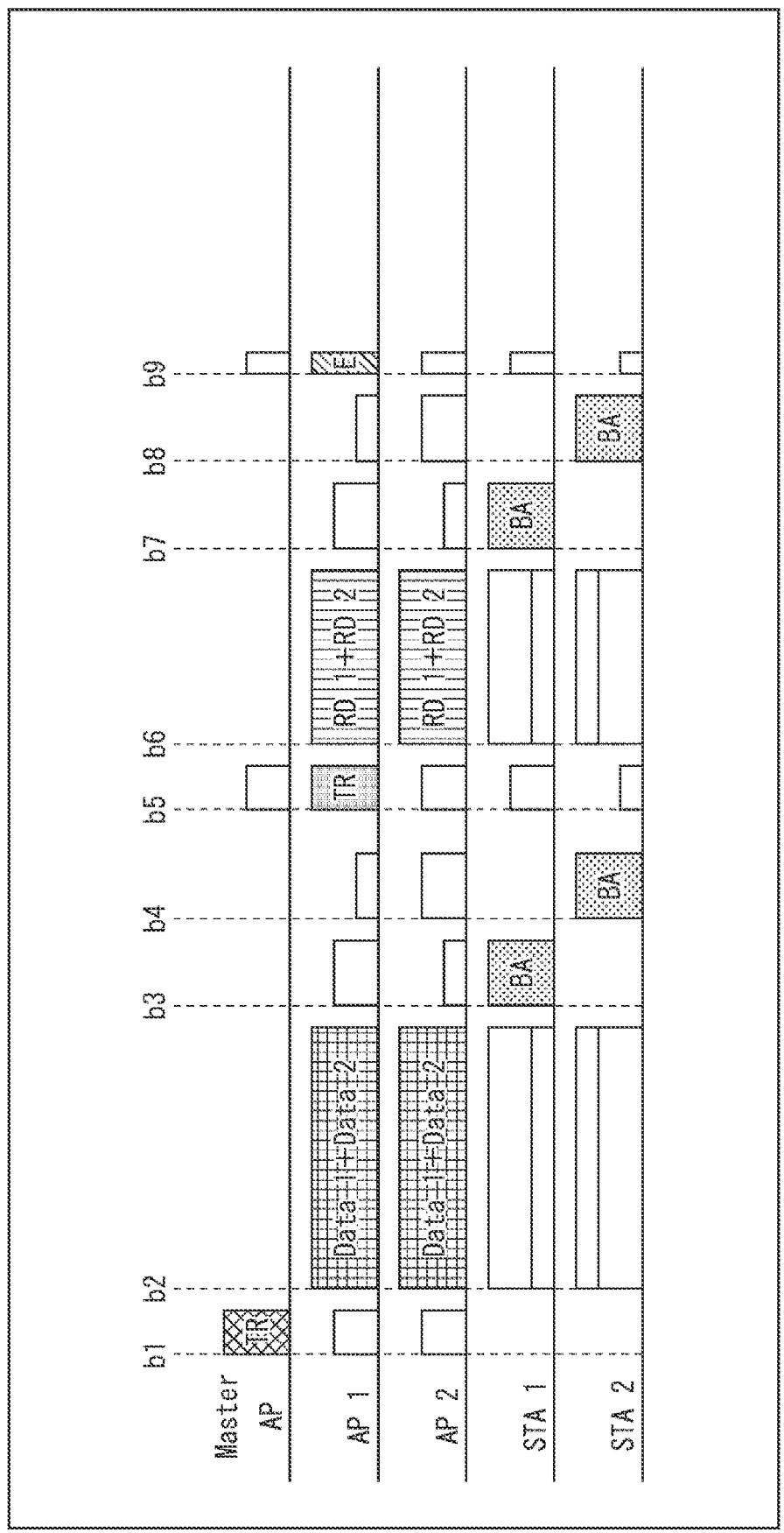
FIG. 4 is a diagram illustrating another example of data transmission and reception timings.

FIG. 4 is a diagram illustrating another example of data transmission and reception timings of the wireless communication system.

FIG. 4 illustrates an example in which a return order of the block ACK frame is set, and the block ACK frame is returned from each STA at a shifted time after an end of data transmission.

At time b1, the Master AP transmits the trigger (TR) frame for coordinate transmission. The AP 1 and the AP 2 receive the trigger (TR) frame for coordinate transmission transmitted from the Master AP.

At time b2, the AP 1 and the AP 2 coordinately transmit the Data 1 addressed to the STA 1 and the Data 2 addressed to the STA 2 on the basis of the trigger (TR) frame of the coordinate transmission. Here, for example, for the data addressed to each STA, a parameter in which a return timing of the block ACK frame for each piece of data is described is set.

At time b3, which is immediately after reception of the Data 1, the STA 1 returns the block ACK (BA) frame addressed to the AP 1 for the Data 1.

At time b4 after the STA 1 returns the block ACK (BA) frame, the STA 2 returns the block ACK (BA) frame addressed to the AP 2 for the Data 2. Thus, the block ACK (BA) frames addressed to all the APs are collected in the AP 1 and the AP 2.

At time b5, in a case where there is data to be retransmitted, the AP 1 transmits the trigger (TR) frame for retransmission.

At time b6, the AP 1 and the AP 2 coordinately transmit RD 1 addressed to the STA 1 and RD 2 addressed to the STA 2 on the basis of the trigger (TR) frame for retransmission. Here, for example, to the retransmission data addressed to each STA, a parameter in which a return timing of the block ACK frame for each retransmission data is described is set.

At time b7, which is immediately after reception of the RD 1, the STA 1 returns the block ACK (BA) frame addressed to the AP 1 for the RD 1.

At time b8 after the STA 1 returns the block ACK (BA) frame, the STA 2 returns the block ACK (BA) frame addressed to the AP 2 for the RD 2. Thus, the block ACK (BA) frames addressed to all the APs are collected in the AP 1 and the AP 2.

At time b9, the AP 1 transmits the end (E) frame by broadcasting. Thus, the Master AP, the AP 2, the STA 1, and the STA 2 grasp the end of the coordinate transmission.

As described above, it is possible to shorten the time required for each AP to receive the block ACK frame from all the STAs.

Figure 5:
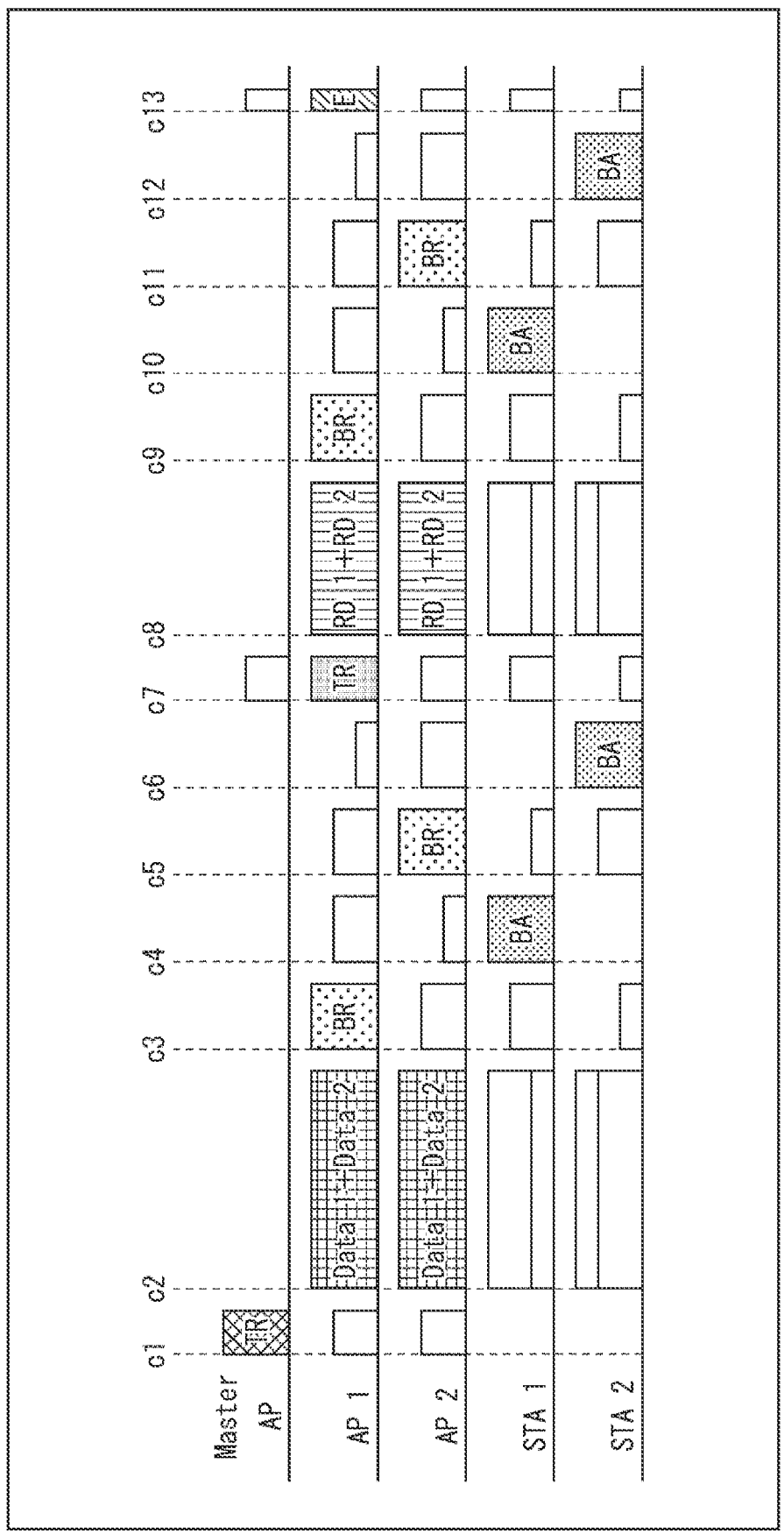
FIG. 5 is a diagram illustrating another example of data transmission and reception timings.

FIG. 5 is a diagram illustrating another example of data transmission and reception timings of the wireless communication system.

FIG. 5 illustrates an example in which all the STAs return the block ACK frame after the block ACK request frame is received.

At time c1, the Master AP transmits the trigger (TR) frame for coordinate transmission. The AP 1 and the AP 2 receive the trigger (TR) frame for coordinate transmission transmitted from the Master AP.

At time c2, the AP 1 and the AP 2 coordinately transmit the Data 1 addressed to the STA 1 and the Data 2 addressed to the STA 2 on the basis of the trigger (TR) frame of the coordinate transmission. Here, for example, to the data addressed to each STA, a parameter is set so that the block ACK frame is returned after the block ACK request frame is received.

At time c3, the AP 1 having a connection relationship with the STA 1 transmits the block ACK request (BR) frame addressed to the STA 1.

At time c4, which is immediately after reception of the block ACK request (BR) frame, the STA 1 returns the block ACK (BA) frame addressed to the AP 1.

At time c5, the AP 2 having the connection relationship with the STA 2 transmits the block ACK request (BR) frame addressed to the STA 2.

At time c6, which is immediately after reception of the block ACK request (BR) frame, the STA 2 returns the block ACK (BA) frame addressed to the AP 2. The block ACK (BA) frames addressed to all the APs are collected in the AP 1 and the AP 2.

At time c7, in a case where there is data to be retransmitted, the AP 1 transmits the trigger (TR) frame for retransmission.

At time c8, the AP 1 and the AP 2 coordinately transmit RD 1 addressed to the STA 1 and RD 2 addressed to the STA 2 on the basis of the trigger (TR) frame for retransmission. Here, for example, to the retransmission data addressed to each STA, a parameter is set so that the block ACK frame is returned after the block ACK request frame is received.

At time c9, the AP 1 having the connection relationship with the STA 1 transmits the block ACK request (BR) frame addressed to the STA 1.

At time c10, which is immediately after reception of the block ACK request (BR) frame, the STA 1 returns the block ACK (BA) frame addressed to the AP 1.

At time c11, the AP 2 having the connection relationship with the STA 2 transmits the block ACK request (BR) frame addressed to the STA 2.

At time c12, which is immediately after reception of the block ACK request (BR) frame, the STA 2 returns the block ACK (BA) frame addressed to the AP 2. The block ACK (BA) frames addressed to all the APs are collected in the AP 1 and the AP 2.

At time c13, the AP 1 transmits the end (E) frame by broadcasting. Thus, the Master AP, the AP 2, the STA 1, and the STA 2 grasp the end of the coordinate transmission.

In the case of FIG. 5, each STA does not return the block ACK frame until receiving the block ACK request frame, and returns the block ACK frame by the block ACK request frame from the AP in a connection relationship with each STA. Therefore, in the case of FIG. 5, it is not necessary to designate the return timing of the block ACK frame.

Figure 6:
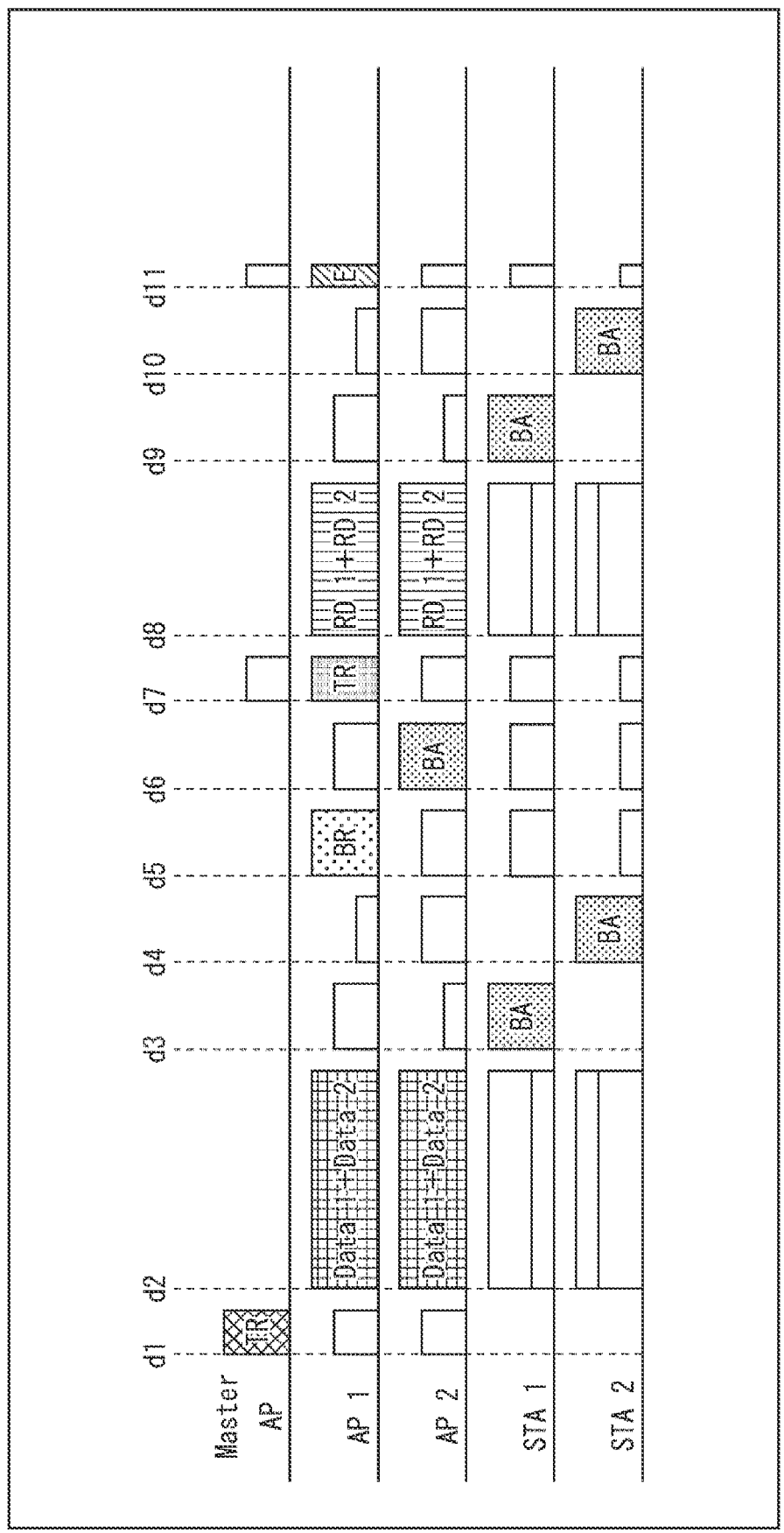
FIG. 6 is a diagram illustrating another example of data transmission and reception timings.

FIG. 6 is a diagram illustrating another example of data transmission and reception timings of the wireless communication system.

FIG. 6 illustrates an example in which, in the sequence of FIG. 4 described above, the AP 1 as the coordinator requests the receipt acknowledgment from the AP 2, and the AP 2 returns the block ACK frame.

At time d1, the Master AP transmits the trigger (TR) frame for coordinate transmission. The AP 1 and the AP 2 receive the trigger (TR) frame for coordinate transmission transmitted from the Master AP.

At time d2, the AP 1 and the AP 2 coordinately transmit the Data 1 addressed to the STA 1 and the Data 2 addressed to the STA 2 on the basis of the trigger (TR) frame of the coordinate transmission.

At time d3, which is immediately after reception of the Data 1, the STA 1 returns the block ACK (BA) frame addressed to the AP 1 for the Data 1.

At time d4 after the STA 1 returns the block ACK (BA) frame, the STA 2 returns the block ACK (BA) frame addressed to the AP 2 for the Data 2. Here, in a case where the AP 1 has failed to receive the block ACK (BA) frame addressed to the AP 2, as described below, the AP 1 can request for return as a proxy of the block ACK frame in the STA 2 to the AP 2 located at a position where the block ACK frame can be received more reliably than the STA 2.

At time d5, the AP 1 transmits the block ACK request (BR) frame addressed to the AP 2.

At time d6, which is immediately after reception of the block ACK request (BR) frame, the AP 2 returns the block ACK (BA) frame from the STA 2 to the AP 1. Thus, the block ACK (BA) frames addressed to all the APs are reliably collected in the AP 1 and the AP 2.

Processing from time d7 to time d11 is basically similar to the processing from b5 to b9 in FIG. 4, and thus the description thereof will be omitted.

As described above, the AP 1 as the coordinator transmits the ACK request (BR) frame to the AP 2, so that data reception statuses in both the APs can be grasped via the AP 2.

Figure 7:
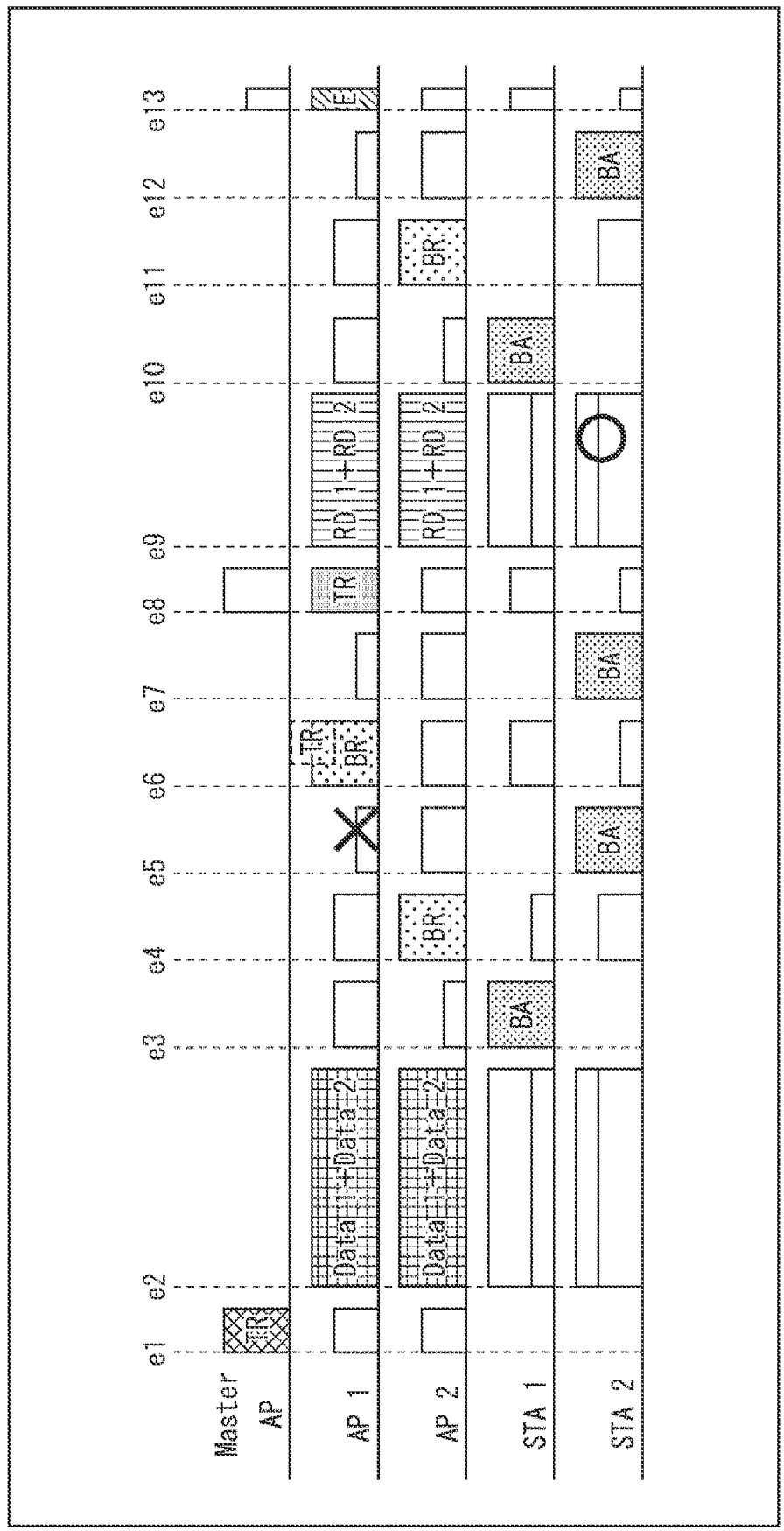
FIG. 7 is a diagram illustrating another example of data transmission and reception timings.

FIG. 7 is a diagram illustrating an example of data transmission and reception timings of the wireless communication system in a case where there is an error in reception of the block ACK frame.

FIG. 7 illustrates an example in which, in FIG. 3 described above, in a case where the AP 1 has failed to receive the block ACK frame from the STA 2, the AP 1 transmits the block ACK request frame to the STA 2 to request retransmission.

At time e1, the Master AP transmits the trigger (TR) frame for coordinate transmission. The AP 1 and the AP 2 receive the trigger (TR) frame for coordinate transmission transmitted from the Master AP.

At time e2, the AP 1 and the AP 2 coordinately transmit the Data 1 addressed to the STA 1 and the Data 2 addressed to the STA 2 on the basis of the trigger (TR) frame of the coordinate transmission.

At time e3, which is immediately after reception of the Data 1, the STA 1 returns the block ACK (BA) frame addressed to the AP 1 for the Data 1.

At time e4, the AP 2 having the connection relationship with the STA 2 transmits the block ACK request (BR) frame addressed to the STA 2.

At time e5, which is immediately after reception of the block ACK request (BR) frame, the STA 2 returns the block ACK (BA) frame addressed to the AP 2 for the Data 2. Here, as indicated by a cross mark, it is assumed that the AP 1 has failed to receive the block ACK (BA) frame addressed to the AP 2 for the Data 2 returned from the STA 2.

Accordingly, at time e6, the AP 1 transmits the block ACK request (BR) frame addressed to the STA 2.

At time e7, which is immediately after reception of the block ACK request (BR) frame, the STA 2 returns the block ACK (BA) frame addressed to the AP 1 for the Data 2. Thus, the block ACK (BA) frames addressed to all the APs are collected in the AP 1 and the AP 2.

Processing from time e8 to time e13 is basically similar to the processing from a6 to a11 in FIG. 3, and thus the description thereof will be omitted.

As described above, in a case where the AP 1 has failed to receive the block ACK frame from the STA 2, the AP 1 transmits the block ACK request (BR) frame at the timing of transmitting the trigger frame for retransmission illustrated in FIG. 3 as indicated by a dotted rectangle. At this time, the block ACK request frame is transmitted with a transmission waiting time shorter than a transmission waiting time of the trigger frame for retransmission. In response to this, the STA 2 transmits the block ACK frame.

Thus, the AP 1 and the AP 2 can collect block ACK (BA) frames addressed to all the APs.

Figure 8:
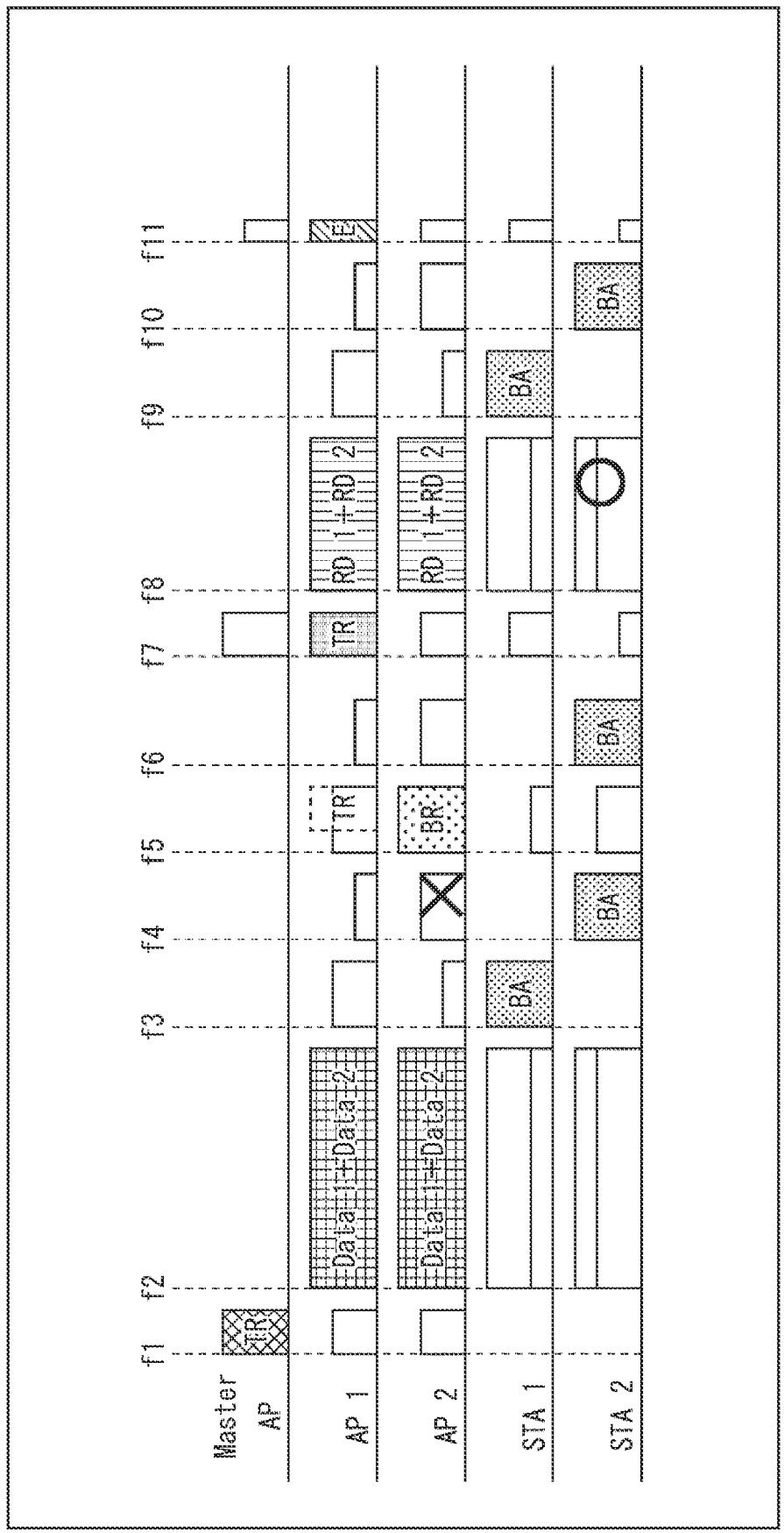
FIG. 8 is a diagram illustrating an example of data transmission and reception timings in a case where there is an error in reception of a block ACK frame.

FIG. 8 is a diagram illustrating another example of data transmission and reception timings of the wireless communication system in a case where there is an error in reception of the block ACK frame.

FIG. 8 illustrates an example in which, in FIG. 4 described above, in a case where the AP 2 has failed to receive the block ACK frame from the STA 2, the AP 2 transmits the block ACK request frame to the STA 2 and requests retransmission of the block AC frame.

At time f1, the Master AP transmits the trigger (TR) frame for coordinate transmission. The AP 1 and the AP 2 receive the trigger (TR) frame for coordinate transmission transmitted from the Master AP.

At time f2, the AP 1 and the AP 2 coordinately transmit the Data 1 addressed to the STA 1 and the Data 2 addressed to the STA 2 on the basis of the trigger (TR) frame of the coordinate transmission.

At time f3, which is immediately after reception of the Data 1, the STA 1 returns the block ACK (BA) frame addressed to the AP 1 for the Data 1.

At time f4 after the STA 1 returns the block ACK (BA) frame, the STA 2 returns the block ACK (BA) frame addressed to the AP 2 for the Data 2. Here, it is assumed that the AP 2 has failed to receive the block ACK (BA) frame addressed to the AP 2 for the Data 2 returned from the STA 2.

Accordingly, at time f5, the AP 2 transmits the block ACK request (BR) frame addressed to the STA 2.

At time f6, which is immediately after reception of the block ACK request (BR) frame, the STA 2 returns the block ACK (BA) frame addressed to the AP 2 for the Data 2. Thus, all the block ACK (BA) frames are collected in the AP 1 and the AP 2.

Processing from the time f7 to the time f11 is basically similar to the processing from b5 to b9 in FIG. 4, and thus the description thereof will be omitted.

As described above, in a case where the AP 2 has failed to receive the block ACK frame addressed to the AP 2 from the STA 2, the AP 2 transmits the block ACK request frame before the timing at which the trigger for retransmission in FIG. 4 is transmitted as indicated by the dotted rectangle. In response to this, the STA 2 transmits the block ACK frame addressed to the AP 2.

In this case, the AP 2 that is not the AP 1 as the coordinator that generates the trigger for retransmission transmits the block ACK request frame. As described above, even the AP that is not the coordinator can grasp in advance the data that needs to be retransmitted by reliably receiving the receipt acknowledgments from all the STAs.

Figure 9:
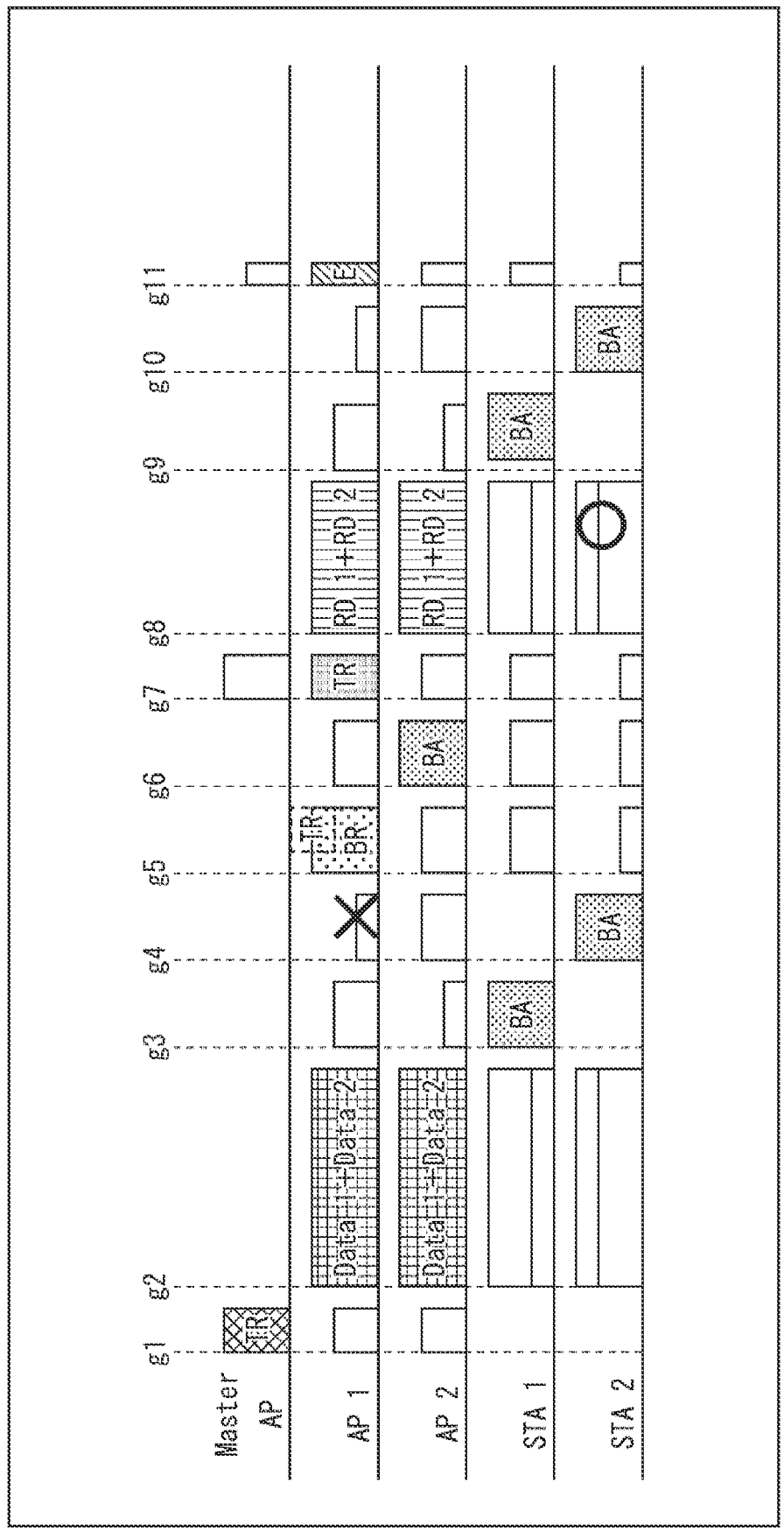
FIG. 9 is a diagram illustrating another example of data transmission and reception timings in a case where there is an error in reception of the block ACK frame.

FIG. 9 is a diagram illustrating another example of data transmission and reception timings of the wireless communication system in a case where there is an error in reception of the block ACK frame.

FIG. 9 illustrates an example in which, in FIG. 4 described above, in a case where the AP 1 has failed to receive the block ACK frame from the STA 2, the AP 1 transmits the block ACK request frame to the AP 2 and confirms the reception status of the STA 2.

At time g1, the Master AP transmits the trigger (TR) frame for coordinate transmission. The AP 1 and the AP 2 receive the trigger (TR) frame for coordinate transmission transmitted from the Master AP.

At time g2, the AP 1 and the AP 2 coordinately transmit the Data 1 addressed to the STA 1 and the Data 2 addressed to the STA 2 on the basis of the trigger (TR) frame of the coordinate transmission.

At time g3, which is immediately after reception of the Data 1, the STA 1 returns the block ACK (BA) frame addressed to the AP 1 for the Data 1.

At time g4 after the STA 1 returns the block ACK (BA) frame, the STA 2 returns the block ACK (BA) frame addressed to the AP 2 for the Data 2. Here, it is assumed that the AP 1 has failed to receive the block ACK (BA) frame addressed to the AP 2 for the Data 2 returned from the STA 2.

Accordingly, at time g5, the AP 1 transmits the block ACK request (BR) frame addressed to the AP 2.

At time g6 immediately after reception of the block ACK request (BR) frame, the AP 2 returns the block ACK (BA) frame addressed to the AP 2 for the Data 2 to the AP 1. Thus, all the block ACK (BA) frames are collected in the AP 1 and the AP 2.

Processing from time g7 to time g11 is basically similar to the processing from b5 to b9 in FIG. 4, and thus the description thereof will be omitted.

As described above, in a case where the AP 1 has failed to receive the block ACK frame from the STA 2, the AP 1 transmits the block ACK request frame addressed to the AP 2 at the timing of transmitting the trigger for retransmission in FIG. 4 as indicated by the dotted rectangle.

<Another Configuration of Wireless Communication System>

Figure 10:
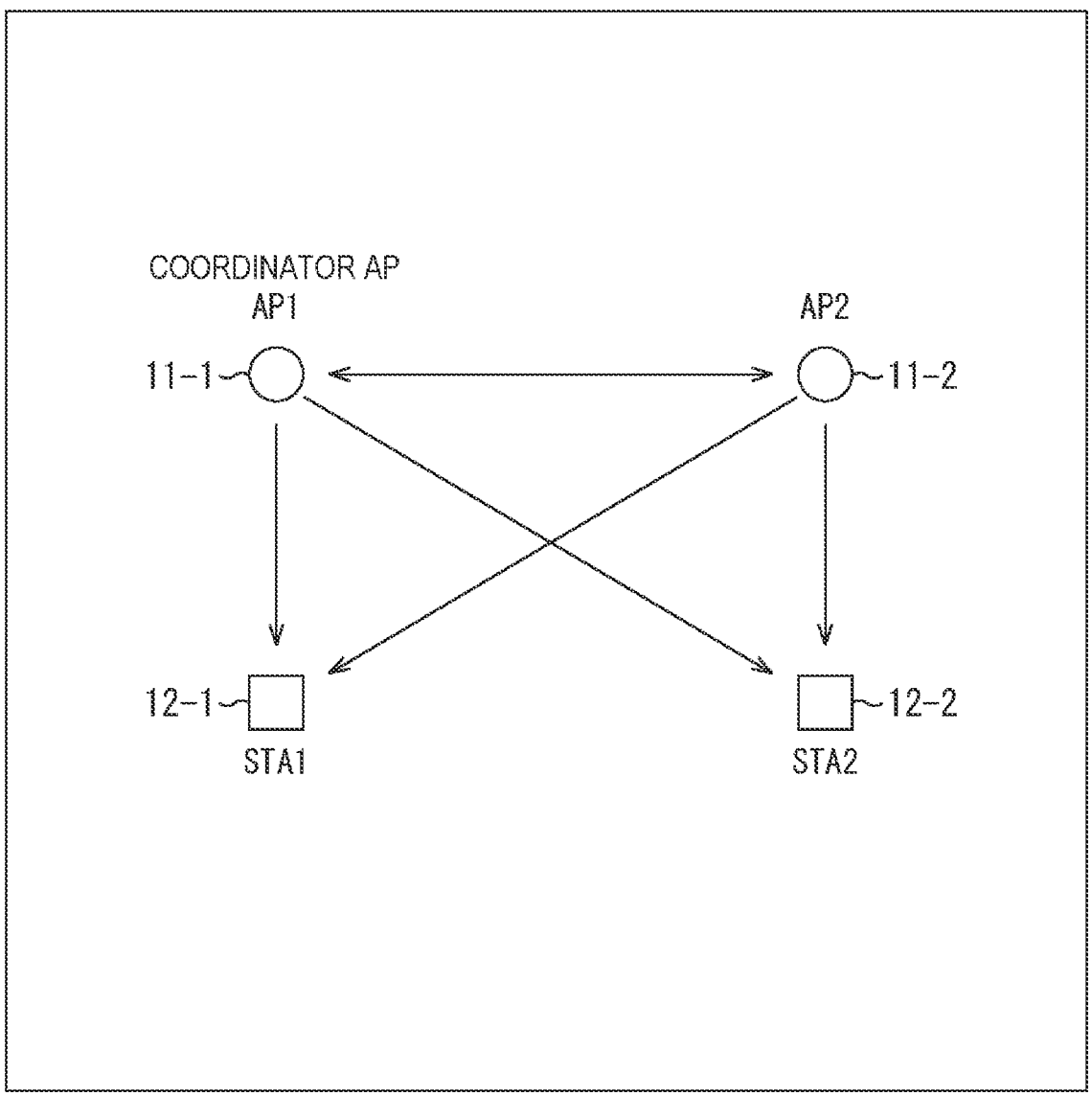
FIG. 10 is a diagram illustrating another configuration example of the wireless communication system to which the present technology is applied.

FIG. 10 is a diagram illustrating another configuration example of the wireless communication system.

The wireless communication system of FIG. 10 is different from the wireless communication system of FIG. 1 in that there is no Master AP. The wireless communication system of FIG. 10 has a configuration in which the AP 1 as the coordinator transmits the trigger frame for the first coordinate transmission and operates as the AP as the coordinator, to thereby perform the coordinate transmission.

Other configurations of the wireless communication system of FIG. 10 are identical to those of the wireless communication system of FIG. 1. Redundant descriptions are omitted.

<Operation of Wireless Communication System>

Figure 11:
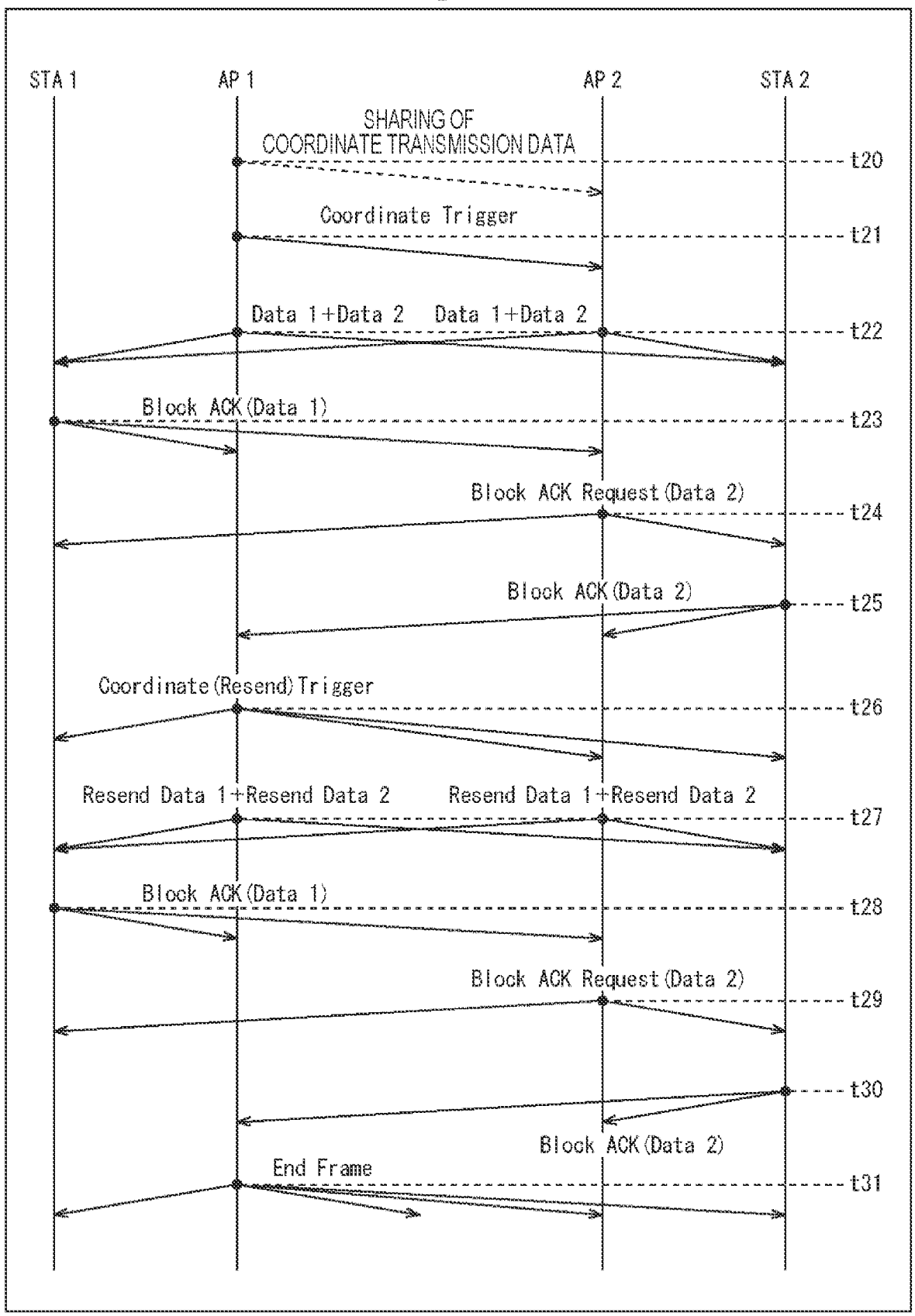
FIG. 11 is a diagram illustrating a communication sequence of coordinate transmission by the wireless communication system in FIG. 10.

FIG. 11 is a diagram illustrating a communication sequence of coordinate transmission by the wireless communication system of FIG. 10.

FIG. 11 illustrates an example in which the AP 1 as the coordinator operates instead of the Master AP in the communication sequence of FIG. 2.

FIG. 11 illustrates a sequence of performing transmission and reception of a predetermined frame until a series of data is delivered without errors in a case where each of the AP 1, the AP 2, the STA 1, and the STA 2 is present. That is, an operation is illustrated in which the AP 1 connected to the Internet network collects data addressed to the STA 1 and the STA 2, and causes itself and the AP 2 to coordinately transmit data addressed to the plurality of STAs at the same timing.

At time t20, the AP 1 transmits data (Data 1+Data 2) to be subjected to the coordinate transmission to the AP 2. Thus, the AP 1 and the AP 2 are in a state of sharing data addressed to the STA 1 and data addressed to the STA 2. Furthermore, it is assumed that the AP 1 is in a state in which it is known that the AP 1 itself transmits a trigger for coordinate transmission.

At time t21, the AP 1 transmits the trigger frame for coordinate transmission (Coordinate Trigger) to the AP 2. Thus, it is notified that the data is coordinately transmitted at a predetermined timing thereafter.

Processing from time t22 to time t31 is basically similar to the processing from t2 to t11 in FIG. 2, and thus the description thereof will be omitted.

<Data Transmission and Reception in Wireless Communication System>

Figure 12:
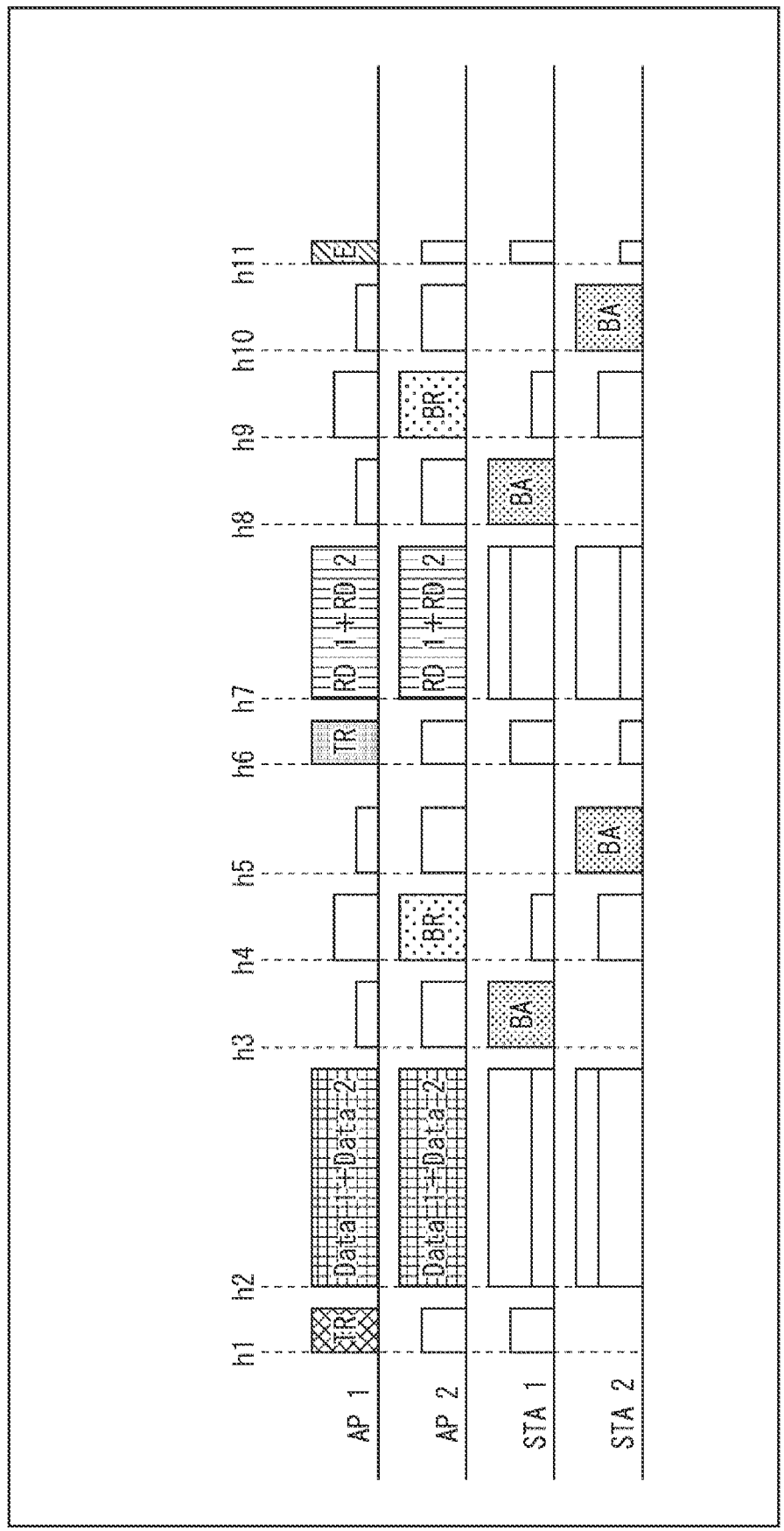
FIG. 12 is a diagram illustrating an example of data transmission and reception timings of the wireless communication system in FIG. 10.

FIG. 12 is a diagram illustrating an example of data transmission and reception timings in the communication sequence of FIG. 11 of the wireless communication system of FIG. 10.

At time h1, the AP 1 transmits the trigger (TR) frame for coordinate transmission. The AP 2 receives the trigger (TR) frame for coordinate transmission transmitted from the Master AP.

At time h2, the AP 1 and the AP 2 coordinately transmit the Data 1 addressed to the STA 1 and the Data 2 addressed to the STA 2 on the basis of the trigger (TR) frame of coordinate transmission.

Processing from time h3 to time h11 is basically similar to the processing from a3 to a11 in FIG. 3, and thus the description thereof will be omitted.

Note that, not only in FIG. 3 but also in FIG. 4 or FIG. 5, the AP 1 as the coordinator can operate instead of the Master AP.

<<2. Configuration of Communication Device>>
<Configuration of Communication Device>

Figure 13:
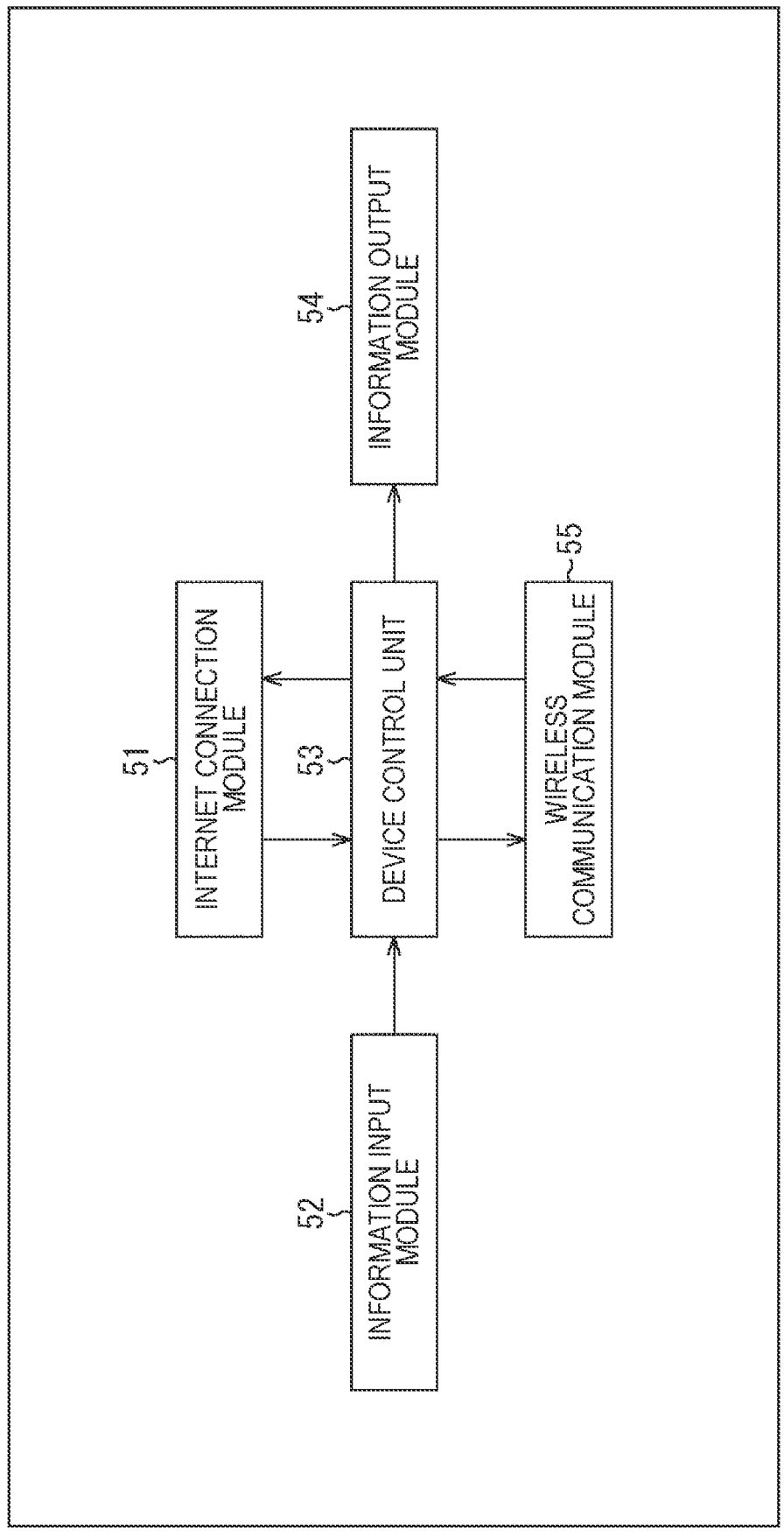
FIG. 13 is a block diagram illustrating a configuration example of a communication device.

FIG. 13 is a block diagram illustrating a configuration example of the communication device 11.

The communication device 11 illustrated in FIG. 13 is a device that operates as an AP.

Note that a configuration of the communication device 12 that operates as the STA and a configuration of the communication device 13 that operates as the Master AP are basically similar to a configuration of the communication device 11, and thus not only a case of operating as an AP but also a case of operating as the STA will be described. Note that, hereinafter, the configuration of the communication device 11 is used for description of the communication device 12 and the communication device 13.

The communication device 11 in FIG. 13 includes an Internet connection module 51, an information input module 52, a device control unit 53, an information output module 54, and a wireless communication module 55.

The Internet connection module 51 is configured to achieve a function of a communication modem for connecting to the Internet network, or the like in a case of operating as the AP according to control of the device control unit 53. The Internet connection module 51 connects a public communication line and the Internet via an Internet service provider or the like.

The information input module 52 outputs information indicating an instruction input by the user to the device control unit 53. The information input module 52 includes a push button, a keyboard, a touch panel, a microphone for inputting and recognizing sound, and the like.

The device control unit 53 includes a central processing unit (CPU), a read only memory (ROM), a random access memory (RAM), and the like. The device control unit 53 executes a program stored in the ROM or the like, causes an application to function in an upper layer, and performs control to cause each unit of the communication device 11 intended by the user to operate as the STA or the AP.

The information output module 54 outputs information regarding an operating state of the communication device 11 supplied from the device control unit 53 or information obtained via the Internet. The information output module 54 includes a display element such as an LED, a liquid crystal panel, or an organic display, a speaker that outputs sound or music, or the like. The information output module 54 performs necessary display and notification to the user.

The wireless communication module 55 transmits data supplied from the device control unit 53 to the other communication device 11 by performing wireless communication. The wireless communication module 55 receives data transmitted from another communication device 11 by performing wireless communication, and outputs the received data to the device control unit 53.

<Configuration of Wireless Communication Module>

Figure 14:
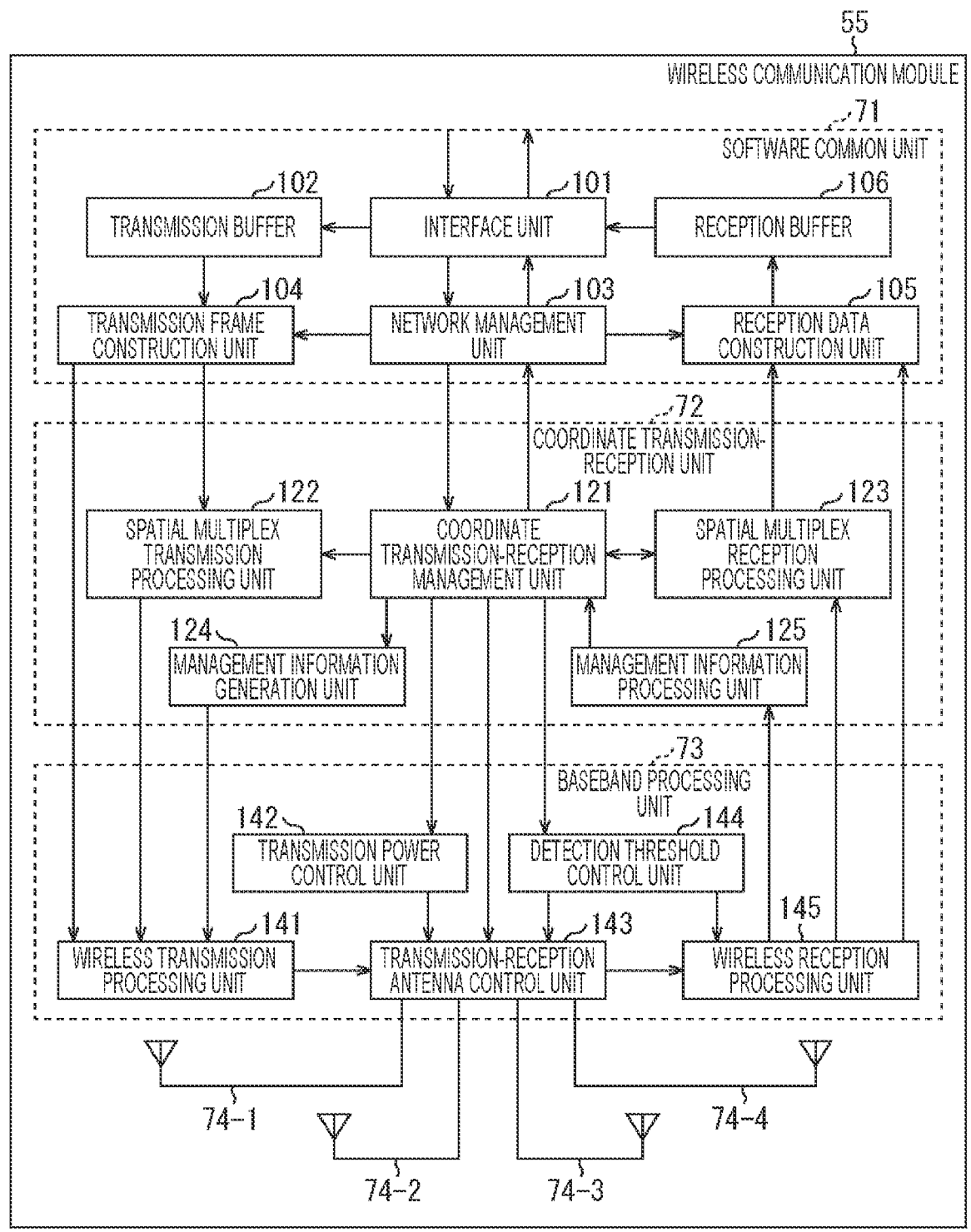
FIG. 14 is a block diagram illustrating a configuration example of a wireless communication module.

FIG. 14 is a block diagram illustrating a configuration example of the wireless communication module 55.

The wireless communication module 55 in FIG. 14 roughly includes a software common unit 71, a coordinate transmission-reception unit 72, a baseband processing unit 73, and antennas 74-1 to 74-4.

The software common unit 71 includes an interface unit 101, a transmission buffer 102, a network management unit 103, a transmission frame construction unit 104, a reception data construction unit 105, and a reception buffer 106.

The coordinate transmission-reception unit 72 includes a coordinate transmission-reception management unit 121, a spatial multiplex transmission processing unit 122, a spatial multiplex reception processing unit 123, a management information generation unit 124, and a management information processing unit 125.

The baseband processing unit 73 includes a wireless transmission processing unit 141, a transmission power control unit 142, a transmission-reception antenna control unit 143, a detection threshold control unit 144, and a wireless reception processing unit 145.

The antennas 74-1 to 74-4 transmit signals supplied from the transmission-reception antenna control unit 143 to an air medium as radio waves, receive radio waves propagating through the air medium, and output the signals to the transmission-reception antenna control unit 143.

The interface unit 101 functions as an interface for exchanging, in a predetermined signal format, information input from the user or data supplied from the Internet network supplied from the device control unit 53, or information provided to the user.

In a case of receiving information input from the user or data for performing wireless transmission via the interface unit 101, the transmission buffer 102 temporarily stores the received information or data.

The network management unit 103 manages address information and the like of communication devices included in the wireless communication system on the basis of the information received via the interface unit 101. In a case of operating as the AP, the network management unit 103 manages the STA connected to itself, the AP that performs coordinate transmission, and the AP to which the coordinate transmission is performed. In the case of operating as the STA, the network management unit 103 manages an AP to which the network management unit 103 itself is connected.

The network management unit 103 grasps the presence of other APs existing in the surroundings on the basis of information supplied from the coordinate transmission-reception management unit 121. Furthermore, the network management unit 103 controls the coordinate transmission-reception management unit 121, and performs control to operate in cooperation with the other APs as necessary.

The transmission frame construction unit 104 constructs data to be transmitted as a data frame for wireless communication. The transmission frame construction unit 104 constructs an A-MPDU frame which is an aggregated MPDU frame by collecting a plurality of MAC protocol data units (MPDUs) stored in the transmission buffer 102. The transmission frame construction unit 104 outputs the constructed A-MPDU frame to the coordinate transmission-reception unit 72 or the baseband processing unit 73.

The reception data construction unit 105 removes predetermined header information from the A-MPDU frame supplied from the coordinate transmission-reception unit 72 or the baseband processing unit 73, and extracts the MPDU. Moreover, the reception data construction unit 105 extracts only necessary data from the MPDU. The reception data construction unit 105 outputs the extracted data to the reception buffer 106.

The reception buffer 106 is a buffer for temporarily storing the extracted data until all the data is prepared on the basis of a data sequence. The reception buffer 106 stores data until a timing of outputting the data to the connected application device arrives. When the timing of outputting data arrives, the reception buffer 106 outputs data to the device control unit 53 via the interface unit 101.

The coordinate transmission-reception management unit 121 controls transmission-reception of data (including retransmission data) to be coordinately transmitted and transmission-reception of a control frame on the basis of information supplied from the network management unit 103 and the management information processing unit 125. The coordinate transmission-reception management unit 121 controls, for example, a part of the spatial multiplex transmission processing unit 122, the spatial multiplex reception processing unit 123, the management information generation unit 124, and the baseband processing unit 73.

In a case of operating as the AP, the coordinate transmission-reception management unit 121 determines whether or not the operation of coordinate transmission according to the present technology can be performed, and sets parameters.

Specifically, in a case of operating as the Master AP or the AP as the coordinator, the coordinate transmission-reception management unit 121 performs control to transmit the data frame, the trigger frame, and the end frame. In a case of operating as an AP other than above ones, the coordinate transmission-reception management unit 121 performs control to receive the trigger frame and the end frame.

Furthermore, in a case of operating as the STA, the coordinate transmission-reception management unit 121 performs various settings for receiving data to be coordinately transmitted by receiving the trigger frame and the end frame.

Under control of the coordinate transmission-reception management unit 121, the spatial multiplex transmission processing unit 122 performs setting necessary for the coordinate transmission of a plurality of spatial multiplexing streams for the frame supplied from the transmission frame construction unit 104.

Specifically, for example, setting of a spatial multiplexing number and setting of various parameters necessary for transmission of the spatial multiplexing stream are performed. In a case where data addressed to another communication terminal is multiplexed and transmitted, the spatial multiplex transmission processing unit 122 sets necessary parameters each time. The spatial multiplex transmission processing unit 122 outputs a set frame to the baseband processing unit 73.

The spatial multiplex transmission processing unit 122 performs control for matching the timing of coordinate transmission with adjacent APs and transmitting with necessary parameters being matched.

Under the control of the coordinate transmission-reception management unit 121, the spatial multiplex reception processing unit 123 performs setting necessary for simultaneously receiving a plurality of spatial multiplexing streams supplied from the wireless reception processing unit 145. For example, setting of the spatial multiplexing number and setting of various parameters necessary for receiving the spatial multiplexing stream are performed.

Specifically, the spatial multiplex reception processing unit 123 performs control for extracting the spatial multiplexing stream required by reception by itself from a spatial multiplexing frame transmitted from the AP.

The spatial multiplex reception processing unit 123 grasps that identical data is transmitted from different APs, and combines received data thereof as necessary to generate reception data. The spatial multiplex reception processing unit 123 outputs the generated reception data to the reception data construction unit 105.

Under the control of the coordinate transmission-reception management unit 121, the management information generation unit 124 generates a signal necessary for network management and the control frame necessary for a communication control protocol.

In a case of operating as the AP, the management information generation unit 124 generates the trigger frame, the end frame, the block ACK request frame, and the like as the control frame. In the case of operating as the STA, the management information generation unit 124 generates the block ACK frame as the control frame.

In a case where the received frame is a control frame, the management information processing unit 125 generates control information necessary for the communication control protocol. In a case where the received frame is the trigger frame, the management information processing unit 125 notifies the coordinate transmission-reception management unit 121 of the parameter described in the trigger frame, and causes the parameter of the AP to be grasped.

In a case of operating as the AP, when the received frame is the block ACK frame, the management information processing unit 125 notifies the coordinate transmission-reception management unit 121 of a parameter of receipt confirmation information, and causes the coordinate transmission-reception management unit 121 to grasp retransmission data.

In a case of operating as the STA, when the received frame is the block ACK request frame, the management information processing unit 125 causes the management information generation unit 124 to transmit the block ACK frame via the coordinate transmission-reception management unit 121. That is, the coordinate transmission-reception management unit 121 causes the management information generation unit 124 to generate the block ACK frame and outputs the block ACK frame to the wireless transmission processing unit 141. In response to this, the wireless transmission processing unit 141 transmits the block ACK frame.

The wireless transmission processing unit 141 adds a predetermined preamble to a transmission target data frame or the like supplied from the transmission frame construction unit 104 or the spatial multiplex transmission processing unit 122 in a predetermined frequency channel. The wireless transmission processing unit 141 converts the frame to which the preamble is added into a predetermined baseband signal, processes the signal as an analog signal, and outputs the signal to the transmission-reception antenna control unit 143.

In FIG. 14, the wireless transmission processing unit 141 is configured as one element, but in a case of handling a plurality of spatial multiplexing streams, the wireless transmission processing unit 141 may be configured such that a plurality of elements operates in parallel in order to simultaneously transmit the respective streams. That is, the signals of the respective spatial multiplexing streams may be supplied from the plurality of wireless transmission processing units 141 to the antennas 74-1 to 74-4.

Under the control of the coordinate transmission-reception management unit 121, the transmission power control unit 142 controls transmission power of the transmission-reception antenna control unit 143 so that a signal does not reach an unnecessary radio wave reaching range in a case of transmitting a predetermined frame. Furthermore, the transmission power control unit 142 adjusts the transmission power of the transmission-reception antenna control unit 143 to required transmission power so that the signal reaches the reception side with intended reception field intensity.

The transmission-reception antenna control unit 143 is formed by connecting the plurality of antennas 74-1 to 74-4. The transmission-reception antenna control unit 143 performs control to wirelessly transmit a signal supplied from the wireless transmission processing unit 141 as the spatial multiplexing stream under the control of the coordinate transmission-reception management unit 121.

Furthermore, the transmission-reception antenna control unit 143 performs control to receive a signal transmitted as the spatial multiplexing stream under the control of the coordinate transmission-reception management unit 121. The transmission-reception antenna control unit 143 outputs the received signal to the wireless reception processing unit 145.

In a case where transmission power control is performed, the detection threshold control unit 144 sets, in the transmission-reception antenna control unit 143, a detection level of a signal that enables detection of a signal from a communication device present within the range under the control of the coordinate transmission-reception management unit 121. For example, the detection threshold control unit 144 includes a function of performing control so that a signal can be detected with a required detection threshold at the time of receiving the signal of the transmission-reception antenna control unit 143.

In a case where a predetermined preamble signal is detected in the signal supplied from the transmission-reception antenna control unit 143, the wireless reception processing unit 145 separates individual streams and performs reception processing of a header and data to be added thereafter. The wireless reception processing unit 145 outputs the received header and data to the reception data construction unit 105, the spatial multiplex reception processing unit 123, and the management information processing unit 125.

Although the wireless reception processing unit 145 is configured as one element, in a case of handling a plurality of spatial multiplexing streams, the wireless reception processing unit 145 may be configured such that a plurality of elements operates in parallel in order to simultaneously receive the respective streams. That is, the signals supplied from the respective antennas 74-1 to 74-4 may be supplied to the plurality of wireless reception processing units 145.

<<3. Configuration of Frame>>

Hereinafter, configurations of the frames will be described with reference to FIGS. 15 to 20. Note that description of the same parts as those of conventional frame configurations will be omitted as appropriate.

<Configuration of Trigger Frame>

Figure 15:
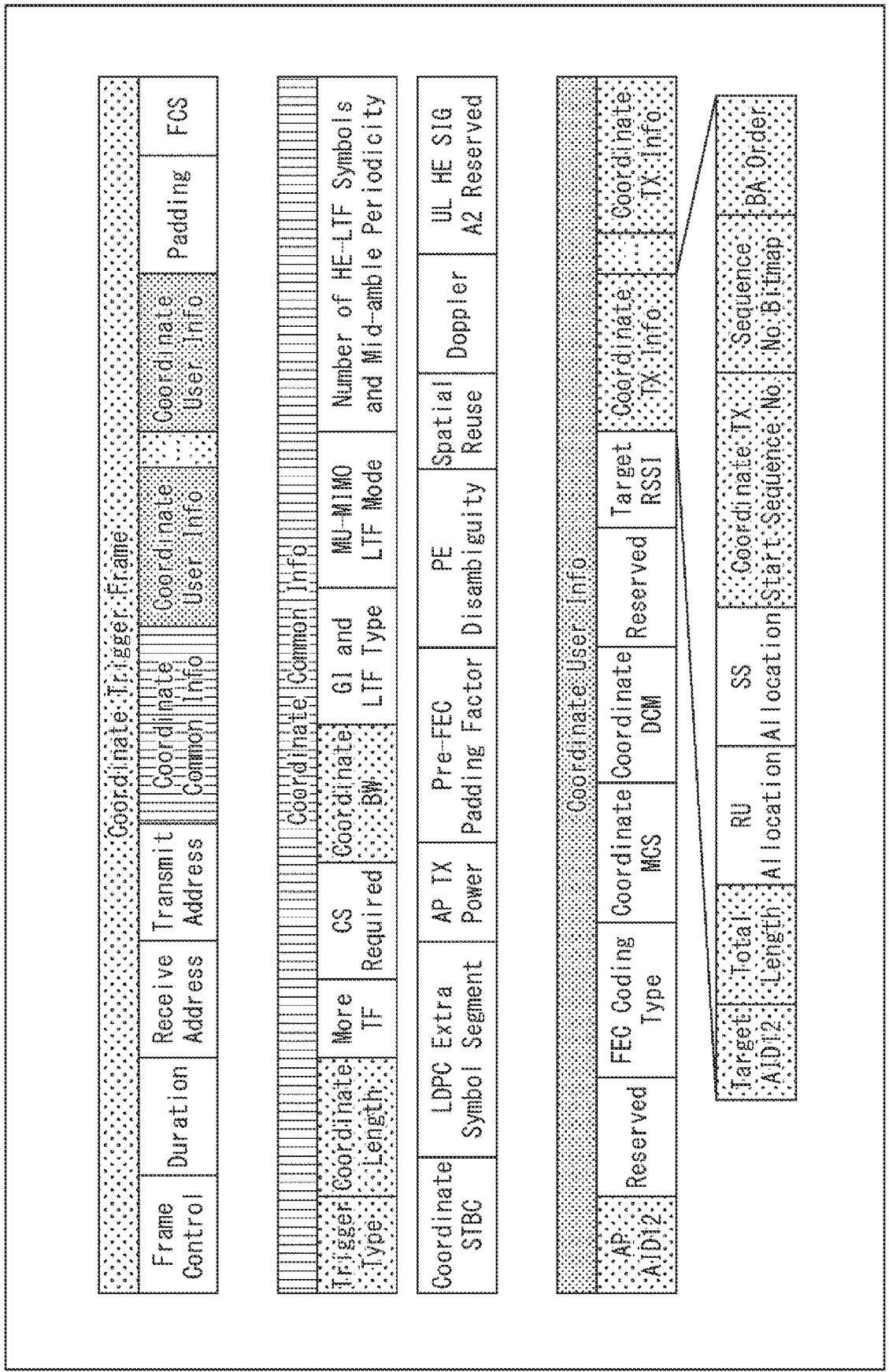
FIG. 15 is a diagram illustrating a configuration example of a trigger frame for coordinate transmission to which the present technology is applied.

FIG. 15 is a diagram illustrating a configuration example of the trigger frame for coordinate transmission to which the present technology is applied.

In FIG. 15, hatched Coordinate Common Info and Coordinate User Info are portions to which the present technology is applied. In the following diagrams, similarly, portions to which the present technology is applied are hatched.

The trigger frame for coordinate transmission in FIG. 15 includes Frame Control, Duration, Receive Address, Transmit Address, Coordinate Common Info, Coordinate User Info, Padding, and FCS.

The Frame Control stores information indicating the type of frame. The Duration stores information indicating a connection time of a frame. The Receive Address stores information indicating an address of a reception destination. The Transmit Address stores information indicating an address of a transmission source.

The Coordinate Common Info stores common information of coordinate transmission of the present technology. The Coordinate User Info is individually provided for each user (the AP 1, the AP 2) who performs coordinate transmission, and stores information for each user. The padding is used to adjust the frame length. The FCS is arranged for error detection.

Trigger Type of the Coordinate Common Info has a configuration in which an identifier capable of newly identifying Coordinate Trigger can be set in addition to an identifier of a conventional trigger frame. Coordinate Length in which an information length of the Coordinate Common Info is stored is also appropriately changed.

Furthermore, parameters such as Coordinate BW (Bandwidth) storing information indicating a bandwidth to be transmitted are also appropriately changed.

In the Coordinate User Info, Coordinate TX Info is newly arranged as many as the number of STAs to be reception destinations of the AP indicated by an AID 12 of the AP.

Note that RU Allocation and SS Allocation of the conventional method are allocated for each STA as a reception target, and thus are referred to as Reserved.

The Coordinate TX Info includes Target AID 12, Total Length, RU Allocation, SS Allocation, Coordinate TX Start Sequence No., Sequence No. Bitmap, and BA Order.

The Target AID 12 stores information for identifying the STA as a reception target. The Total Length stores a substantial information length excluding the Padding.

The Coordinate TX Start Sequence No. stores a start sequence number. The Sequence No. Bitmap stores map information of a sequence number in a case where the A-MPDU is configured by aggregation.

The BA Order stores necessity of returning and information regarding return timing of the block ACK frame. The information regarding return timing is, for example, information indicating the order of return timing, the return timing, or return order. In a case where the block ACK frame is immediately returned after the lapse of SIFS immediately after data transmission, the information indicating the order of return timing stores, for example, Immediate_ACK. Note that, for example, in a case where the order of Immediate_ACK is designated, the block ACK frame of the second Immediate_ACK in the order of the return timing is transmitted as the block ACK frame after the lapse of the SIFS after a transmission time of the block ACK frame of the first Immediate_ACK.

Furthermore, for example, in a case where the block ACK frame is returned after waiting for the BAR frame, the information indicating the order of return timing stores, for example, delayed_ACK.

Note that the trigger frame for coordinate transmission in FIG. 15 has a configuration similar to that of the conventional trigger frame, but may be appropriately changed as necessary. Furthermore, the configuration of the trigger frame for retransmission is similar to that of the trigger frame in FIG. 15, and thus the description thereof will be omitted.

Because other APs that perform coordinate transmission can be known by the trigger frame, the AP as the coordinator can also receive the receipt acknowledgment addressed to the other APs.

<Configuration of Data Frame>

Figure 16:
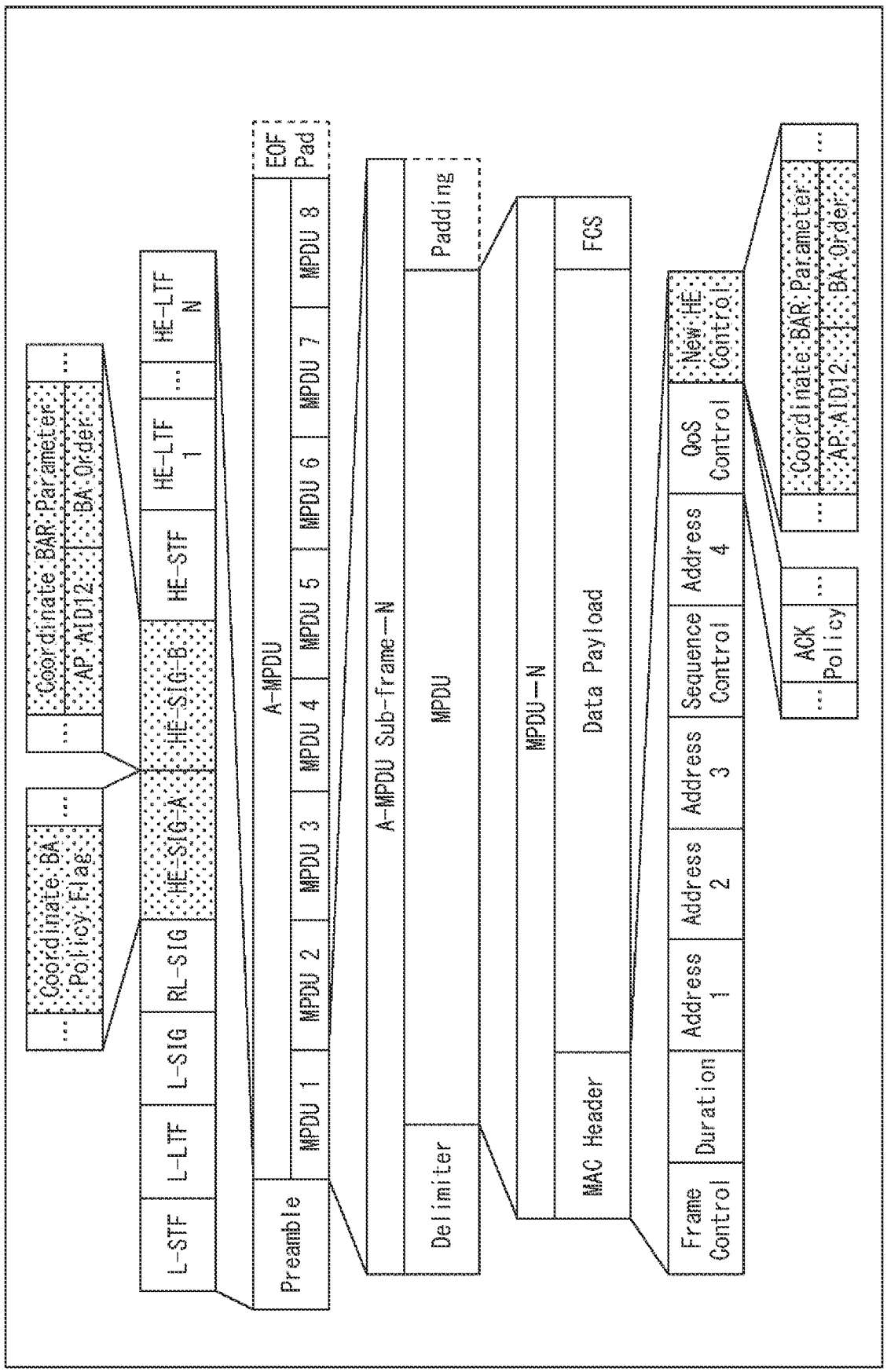
FIG. 16 is a diagram illustrating a configuration example of a data frame to which the present technology is applied.

FIG. 16 is a diagram illustrating a configuration example of a data frame to which the present technology is applied.

The data frame in FIG. 16 is based on a conventional aggregated MAC Layer Protocol Data Unit (MPDU) configuration. That is, the data frame in FIG. 16 has a configuration compatible with the conventional method.

FIG. 16 illustrates an example in which a Coordinate BA Policy Flag is stored in an HE SIG-A field as an example in which a parameter necessary for coordinate transmission that is a feature of the present technology is stored in a Physical Layer Convergence Protocol (PLCP) header. Thus, it is possible to identify that the frame corresponds to the format of the present technology.

Furthermore, a Coordinate BAR Parameter field is newly provided in the HE SIG-B field. The Coordinate BAR Parameter field includes an AP AID 12 and a BA Order. Here, the AP AID 12 stores information for identifying a Coordinate AP as a reception target of the block ACK frame. The BA Order stores information indicating the necessity of returning the block ACK frame and the order of the return timing.

That is, these fields are configured to be delivered from the AP to the STA by reflecting the values described as parameters in the Coordinate TX Info of the trigger frame described above.

Furthermore, FIG. 16 also illustrates an example in which the Coordinate BAR Parameter field is arranged in a New HE Control field to be newly defined in the MAC header, as another arrangement example of the Coordinate BAR Parameter field.

Specifically, conventionally, a configuration has been employed in which a method of returning an ACK is designated as ACK Policy in the QoS Control field.

On the other hand, in the present technology, the Coordinate BAR Parameter field is arranged in the New HE Control field. Then, the Coordinate BAR Parameter field may store the AP AID 12 and the BA Order for identifying the address of the Coordinate AP as a reception target of the block ACK frame.

According to any of the methods illustrated in FIG. 16, the data frame of the present technology is configured to be compatible with the data frame of the conventional method. Furthermore, the data frame of the present technology has a configuration in which, even in a case where there is no BAR frame, the method of returning the block ACK frame is specified by the description of these parameters.

<Configuration of Block ACK Request Frame>

Figure 17:
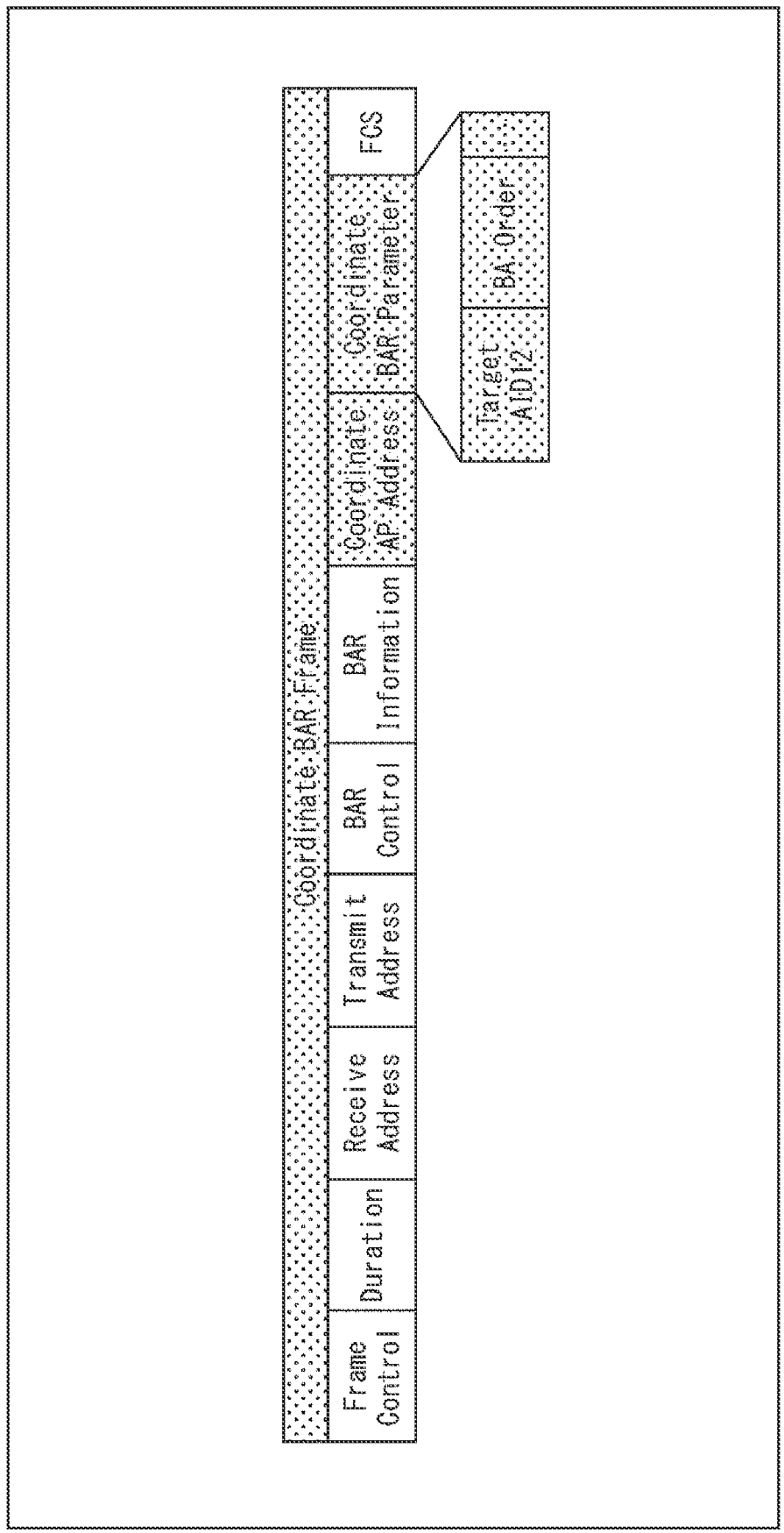
FIG. 17 is a diagram illustrating a configuration example of a block ACK request frame to which the present technology is applied.

FIG. 17 is a diagram illustrating a configuration example of the block ACK request frame (Coordinate BAR Frame) to which the present technology is applied.

The block ACK request frame in FIG. 17 is configured by adding a Coordinate AP Address for identifying the AP to perform coordinate transmission and the Coordinate BAR Parameter including a sequence information parameter of the coordinate transmission. In the Coordinate AP Address, for example, the address for identifying the AP as the coordinator is set, but in a case where there is a plurality (for example, three) of APs for coordinate transmission, an address for identifying the APs other than the AP as the coordinator may be additionally set.

The Coordinate BAR Parameter stores parameters such as the Target AID 12 for identifying the STA that performs ACK return of the coordinately transmitted data, and a BA Order indicating the order of return timing of the block ACK frame.

Furthermore, in a case where the block ACK request frame is transmitted to the plurality of STAs, by setting each of the Target AID 12 and the BAR Order, it is possible to obtain return of a plurality of block ACK frames only by transmitting one block ACK request frame.

Note that the block ACK request frame can have a configuration similar to that of the conventional block ACK request frame.

<Configuration of Block ACK Frame>

Figure 18:
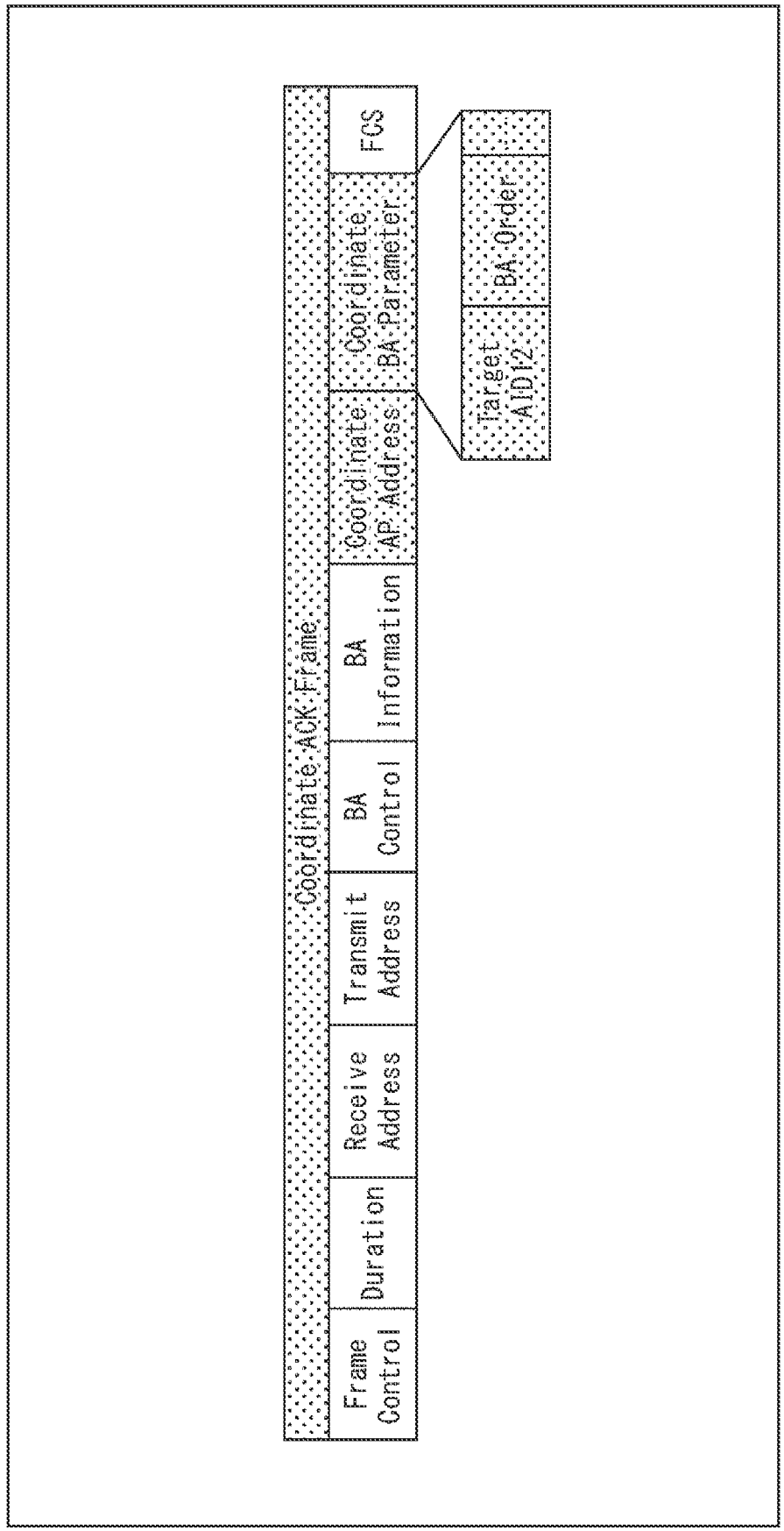
FIG. 18 is a diagram illustrating a configuration example of the block ACK frame to which the present technology is applied.

FIG. 18 is a diagram illustrating a configuration example of the block ACK frame (Coordinate ACK Frame) to which the present technology is applied.

The block ACK frame in FIG. 18 is configured by adding the Coordinate AP Address for identifying the AP that performs coordinate transmission and the Coordinate BA Parameter including the sequence information parameter of the coordinate transmission. These fields are configured such that values described as parameters in the data frame or the block ACK request frame described above are reflected and delivered from the STA to the AP.

In the Coordinate AP Address, for example, the address for identifying the AP as the coordinator is set, but in a case where there is a plurality (for example, three) of APs for coordinate transmission, an address for identifying the APs other than the AP as the coordinator may be additionally set. In this manner, the presence of data to be retransmitted can be grasped in advance by other APs.

The Coordinate BA Parameter stores parameters such as the Target AID 12 for identifying the STA that performs ACK return of the coordinately transmitted data and the BA Order indicating the order of return timing of the block ACK frame.

The AP as the coordinator can know other APs that perform coordinate transmission from the trigger frame and thus can receive the receipt acknowledgment addressed to the other APs, but by checking its own address in the Coordinate AP Address of the block ACK frame, the AP as the coordinator can more reliably receive the receipt acknowledgment addressed to the other APs that perform coordinate transmission.

Note that the block ACK frame can have a configuration similar to that of a conventional block ACK frame.

<Configuration of Multi-User Block ACK Request Trigger Frame>

Figure 19:
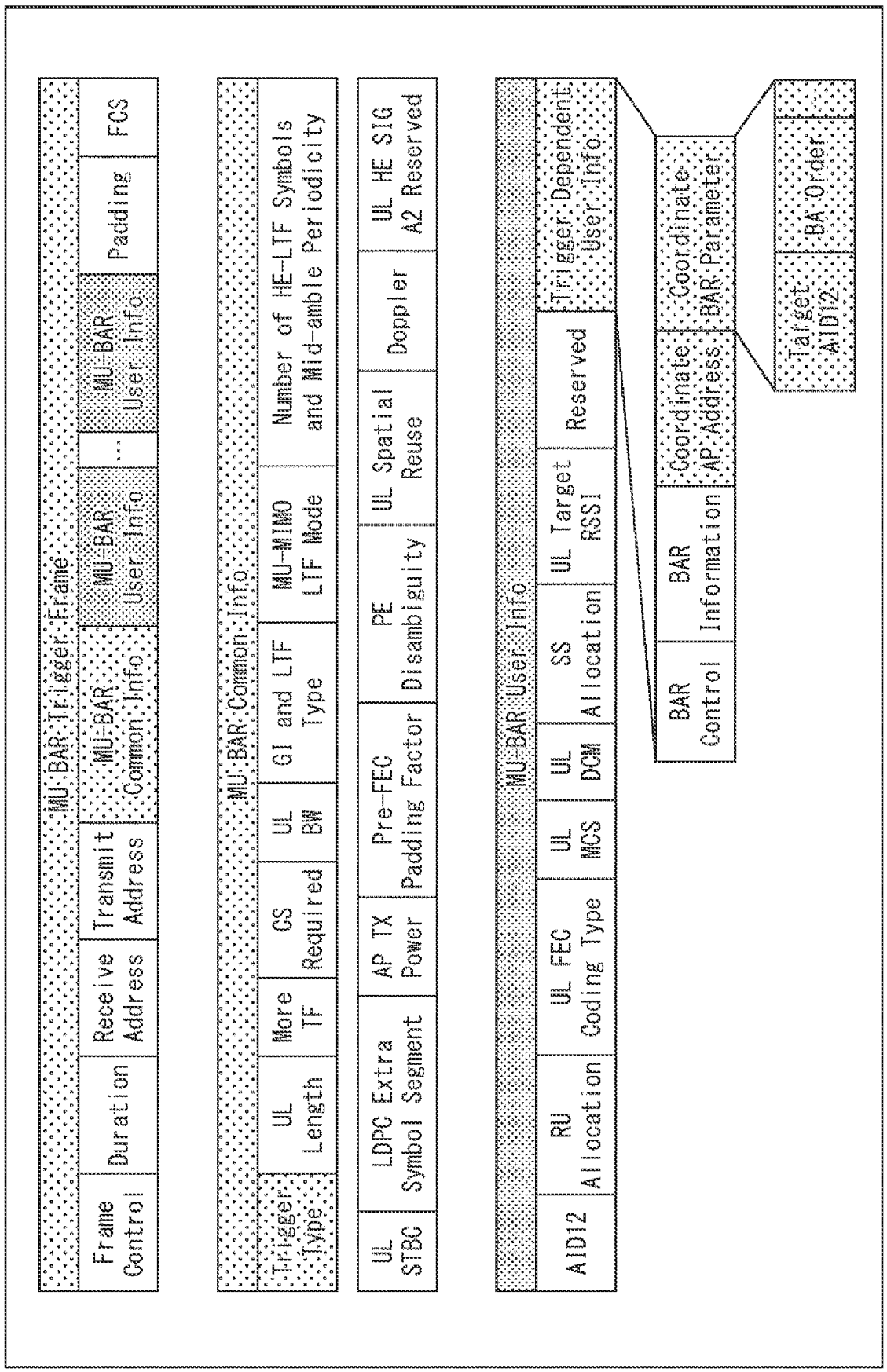
FIG. 19 is a diagram illustrating a configuration example of a multi-user block ACK request trigger frame to which the present technology is applied.

FIG. 19 is a diagram illustrating a configuration example of a multi-user block ACK request trigger frame (MU BAR Trigger Frame) to which the present technology is applied.

The multi-user block ACK request trigger frame in FIG. 19 is configured by adding User Info of MU-BAR. A resource is individually allocated to each STA by User Info of the MU-BAR.

Trigger Dependent User Info of User Info of the MU-BAR is configured by adding a Coordinate AP Address for identifying the AP that performs coordinate transmission and the Coordinate BAR Parameter including the sequence information parameter of coordinate transmission.

The Coordinate BAR Parameter stores parameters such as the Target AID 12 for identifying the STA that returns the ACK of coordinately transmitted data and the BA Order indicating the order of return timing of the block ACK frame.

Note that the multi-user block ACK request trigger frame can have a configuration similar to that of a conventional multi-user block ACK request trigger frame.

<Configuration of End Frame>

Figure 20:
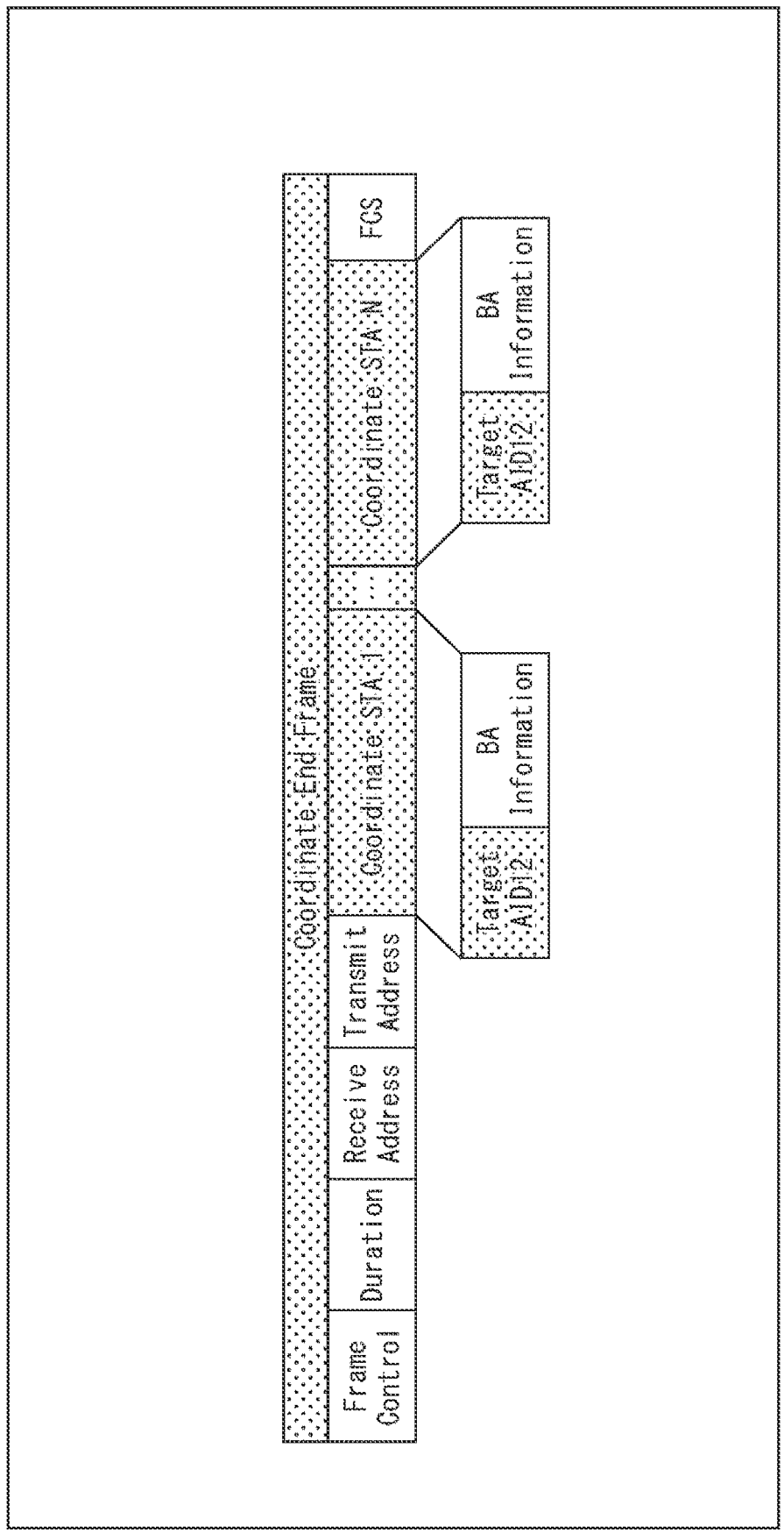
FIG. 20 is a diagram illustrating a configuration example of an end frame to which the present technology is applied.

FIG. 20 is a diagram illustrating a configuration example of an end frame (Coordinate End Frame) to which the present technology is applied.

The end frame includes Frame Control, Duration, Receive Address, Transmit Address, Coordinate STA 1 to STA N, and FCS.

The Frame Control stores information indicating the type of frame. The Duration stores information indicating the duration of the frame. The Receive Address stores information indicating a reception destination address. The Transmit Address stores information indicating an address of a transmission source.

The Coordinate STA 1 to STA N store the Target AID 12 for identifying the target STA and information of the start sequence number up to an end sequence number for each STA.

Note that the end frame may be transmitted for the purpose of giving an instruction to stop retransmission of a series of data and clear the data from the reception buffer in a case where a time for retransmitting the data frame is exceeded, in addition to a case where a series of transmission sequences ends as a result of performing coordinate transmission.

<<<4. Operation of Communication Device>>
<Operation of Master AP>

Figure 21:
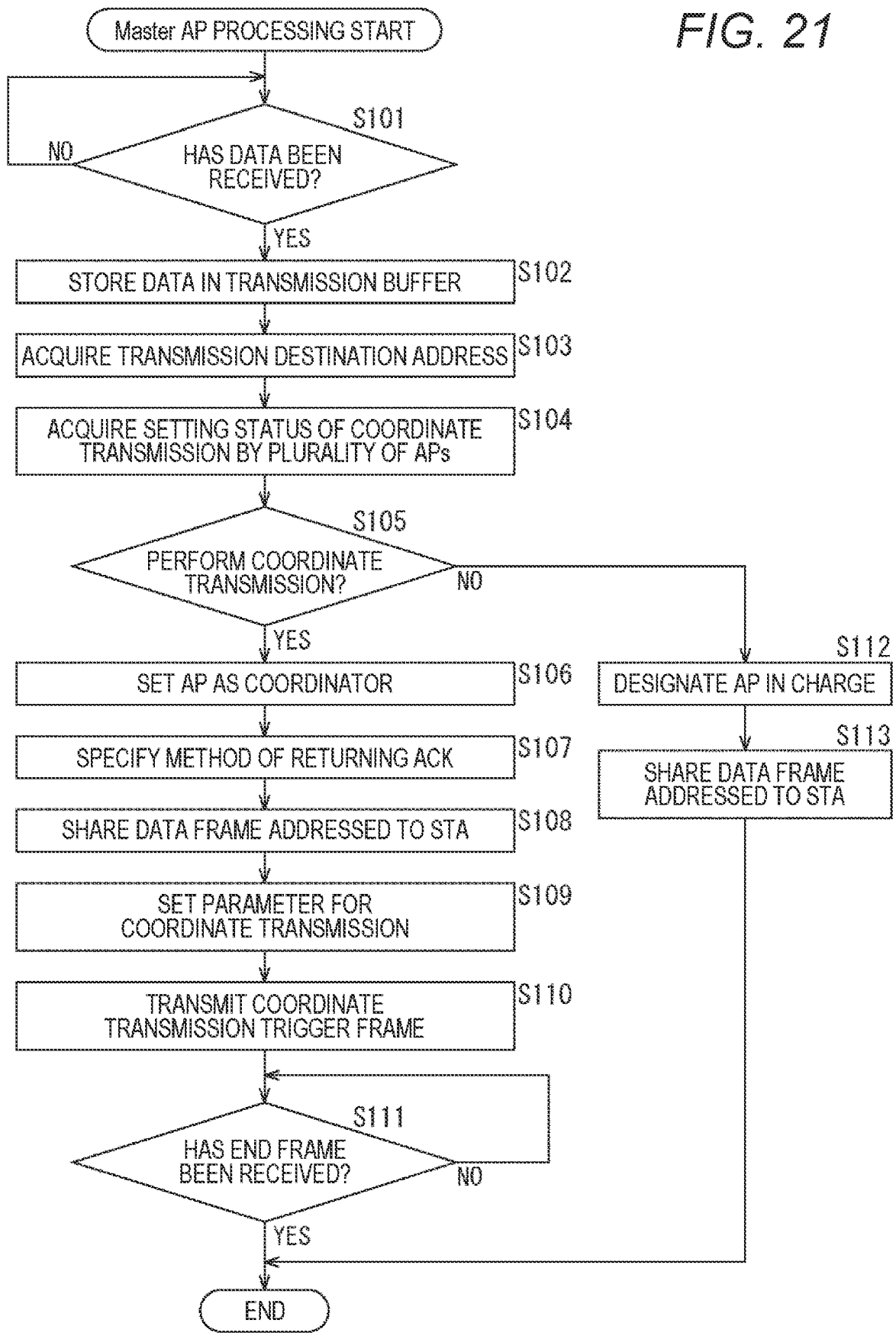
FIG. 21 is a flowchart describing processing of a communication device as a Master AP.

FIG. 21 is a flowchart illustrating processing of the communication device 13 as the Master AP.

In step S101, the device control unit 53 waits until data is received via the Internet, for example. In a case where it is determined in step S101 that the data has been received, the processing proceeds to step S102.

In step S102, the device control unit 53 stores the data in the transmission buffer 102 via the interface unit 101.

In step S103, the network management unit 103 acquires the transmission destination address of the STA as a transmission destination on the basis of information received via the interface unit 101.

In step S104, the coordinate transmission-reception management unit 121 acquires a setting status of coordinate transmission by a plurality of APs.

In step S105, the coordinate transmission-reception management unit 121 determines whether or not to perform the coordinate transmission on the basis of the setting status of the coordinate transmission by the plurality of APs. In a case where it is determined in step S105 to perform the coordinate transmission, the processing proceeds to step S106.

In step S106, the coordinate transmission-reception management unit 121 sets the AP as the coordinator from among the plurality of APs.

In step S107, the coordinate transmission-reception management unit 121 sets a method of returning the receipt acknowledgment (ACK). The method of returning the AP as the coordinator and the receipt acknowledgment is set on the basis of, for example, a positional relationship or a connection relationship with the AP or the STA, a network status, and the like.

The transmission frame construction unit 104 constructs a data frame using the data stored in the transmission buffer 102. The data frame is output to the spatial multiplex transmission processing unit 122.

In step S108, the spatial multiplex transmission processing unit 122 outputs the data frame to the wireless transmission processing unit 141 under the control of the coordinate transmission-reception management unit 121. The data frame is transmitted to the plurality of APs via the transmission-reception antenna control unit 143. Thus, the data frame addressed to the STA is shared among the plurality of APs.

In step S109, the spatial multiplex transmission processing unit 122 sets parameters for the coordinate transmission described in the trigger frame under the control of the coordinate transmission-reception management unit 121. The parameters for the coordinate transmission include the address of the AP as the coordinator set in step S106, the return method of the receipt acknowledgment set in step S107, and the like.

In step S110, the management information generation unit 124 outputs the trigger frame for coordinate transmission to the wireless transmission processing unit 141 to transmit the trigger frame to each AP under the control of the coordinate transmission-reception management unit 121.

In step S111, the coordinate transmission-reception management unit 121 waits until it is determined that the end frame has been received. In a case where the coordinate transmission is completed, the end frame is transmitted from the AP as the coordinator (step S231 in FIG. 24, which will be described later). In this case, it is determined in step S111 that the end frame has been received, and thereafter the processing of the Master AP ends.

On the other hand, in a case where it is determined in step S105 that the coordinate transmission is not performed, the processing proceeds to step S112.

In step S112, the coordinate transmission-reception management unit 121 designates the AP in charge for transmitting data addressed to the STA. For example, the AssociateAP having a connection relationship with the destination STA is designated as the responsible AP.

In step S113, the spatial multiplex transmission processing unit 122 outputs the data addressed to the STA to the wireless transmission processing unit 141 under the control of the coordinate transmission-reception management unit 121. Thus, the Master AP shares the data addressed to the STA with the AP in charge. After the processing of step S113, the processing of the Master AP ends.

<Operation of AP>

Figure 22:
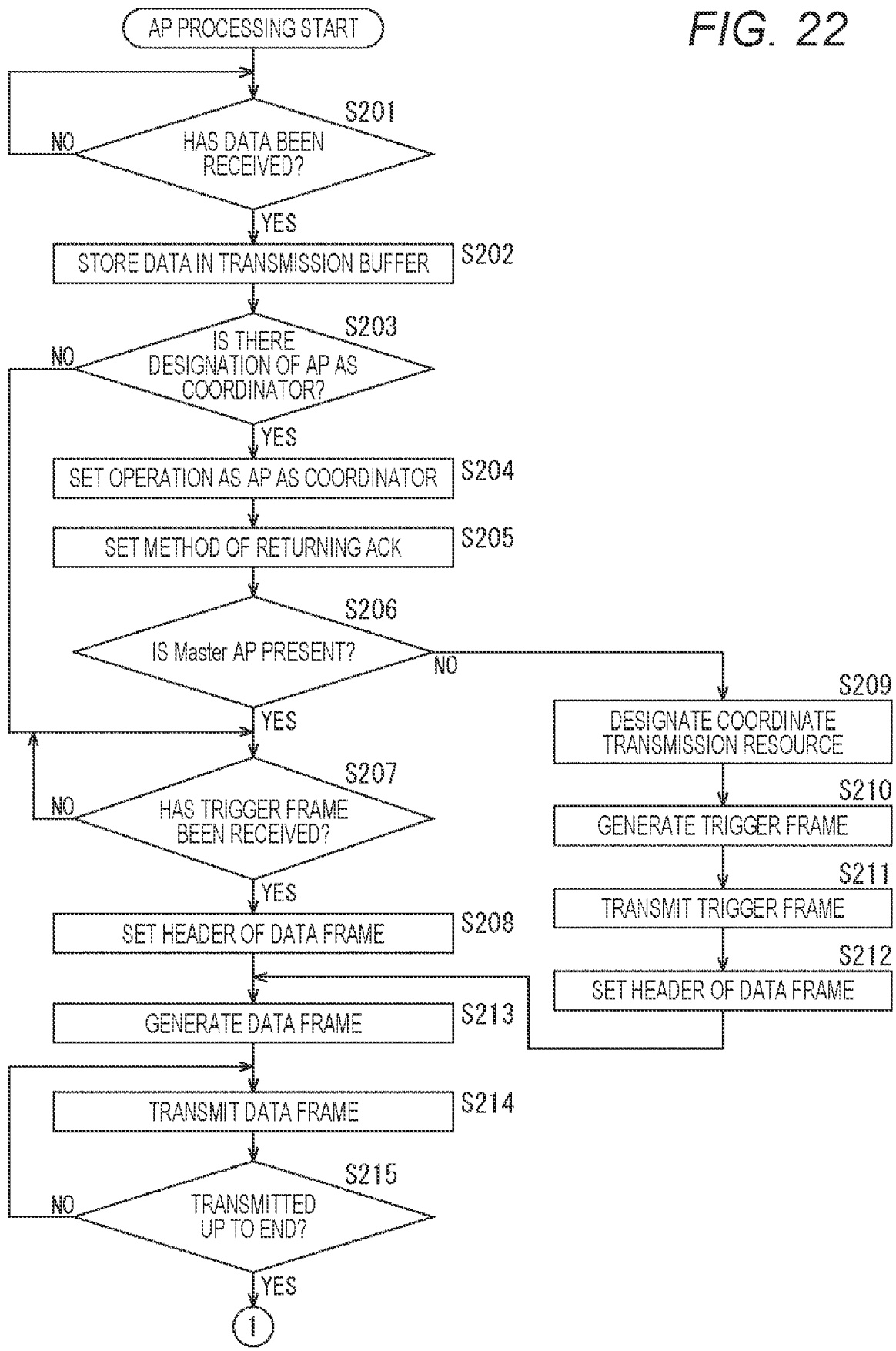
FIG. 22 is a flowchart describing processing of a communication device as an AP.
Figure 23:
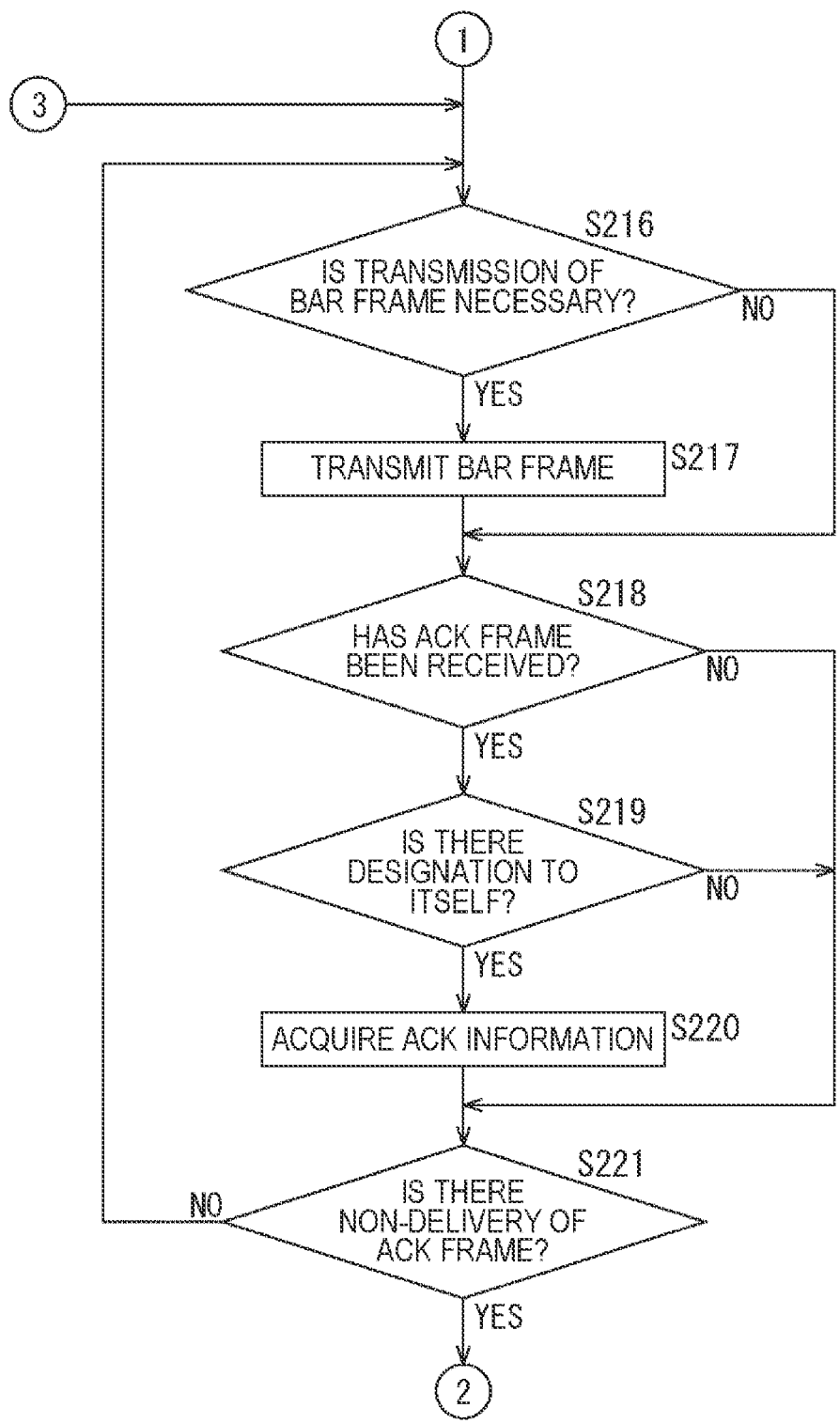
FIG. 23 is a flowchart describing processing of the communication device as the AP, following FIG. 22.
Figure 24:
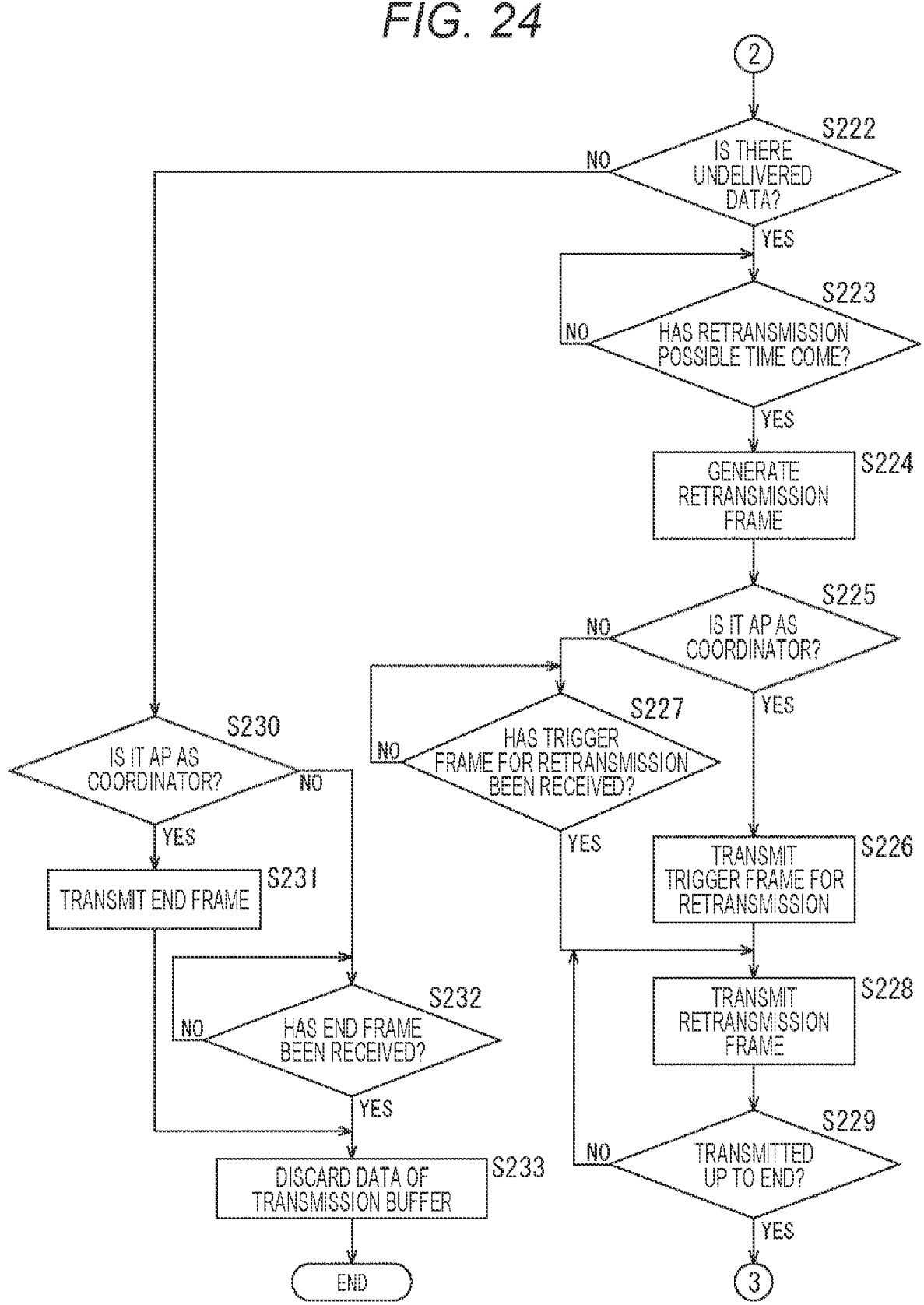
FIG. 24 is a flowchart describing processing of the communication device as the AP, following FIG. 23.

FIGS. 22 to 24 are flowcharts describing processing of the communication device 11 as the AP.

In FIG. 22, for convenience, processing of the AP 1 as the coordinator and processing of another AP 2 are collectively illustrated.

In step S201, the wireless reception processing unit 145 waits until it is determined that data addressed to the STA is received. The Master AP transmits the data addressed to the STA (step S108 in FIG. 21). In a case where it is determined in step S201 that the data addressed to the STA has been received, the processing proceeds to step S202.

The data is stored in the reception buffer 106 via the reception data construction unit 105.

In step S202, the reception buffer 106 stores data in the transmission buffer 102 via the interface unit 101.

Header information of data extracted by the wireless reception processing unit 145 is output to the coordinate transmission-reception management unit 121 via the management information processing unit 125.

Note that in a case where there is no Master AP, the processing in steps S201 and S202 may be similar to the processing in steps S101 and S102 in FIG. 21. That is, the data may be received via the Internet.

In step S203, the coordinate transmission-reception management unit 121 determines whether or not there is a designation of the AP as the coordinator to itself on the basis of, for example, header information of the received data or a surrounding situation of itself supplied from the network management unit 103. In a case where it is determined in step S203 that there is a designation of the AP as the coordinator to itself, the processing proceeds to step S204.

In step S204, the coordinate transmission-reception management unit 121 sets an operation as the AP as the coordinator.

In step S205, the coordinate transmission-reception management unit 121 sets a method of returning the receipt acknowledgment (ACK).

In step S206, the network management unit 103 determines whether or not the Master AP is present. In a case where it is determined in step S206 that the Master AP is present, the processing proceeds to step S207.

On the other hand, in a case where it is determined in step S203 that the AP as the coordinator is not designated to itself, the processing in steps S204 to S206 is skipped, and the processing proceeds to step S207.

In step S207, the coordinate transmission-reception management unit 121 waits until it is determined that the trigger frame for coordinate transmission has been received.

In step S110 of FIG. 21 described above, the Master AP transmits the trigger frame for coordinate transmission. The wireless reception processing unit 145 outputs the trigger frame for coordinate transmission received by the transmission-reception antenna control unit 143 to the coordinate transmission-reception management unit 121 via the management information processing unit 125. In this case, it is determined in step S207 that the trigger frame for coordinate transmission has been received, and the processing proceeds to step S208.

In step S208, the spatial multiplex transmission processing unit 122 sets a header of the data frame under the control of the coordinate transmission-reception management unit 121. At this time, information such as the ACK returning method described in the received trigger frame is used as the header of the data frame. After setting the header, the processing proceeds to step S213.

On the other hand, in a case where it is determined in step S206 that the Master AP is not present, the processing proceeds to step S209.

In step S209, the coordinate transmission-reception management unit 121 designates a resource for coordinate transmission. The resource for coordinate transmission includes, for example, a transmission time, a transmission frequency, and the like.

In step S210, the management information generation unit 124 generates the trigger frame for coordinate transmission under the control of the coordinate transmission-reception management unit 121. That is, in a case where the Master AP is absent, the ACK returning method or the like set by itself is set as the header of the trigger frame for coordinate transmission.

In step S211, the wireless transmission processing unit 141 transmits the trigger frame generated by the management information generation unit 124.

In step S212, the spatial multiplex transmission processing unit 122 sets the header of the data frame under the control of the coordinate transmission-reception management unit 121. In a case where the Master AP is absent, the ACK returning method or the like set by itself is set as the header of the data frame. After setting the header, the processing proceeds to step S213.

In step S213, the spatial multiplex transmission processing unit 122 generates a data frame and outputs the generated data frame to the wireless transmission processing unit 141. Note that in a case where the ACK returning method and the like are described in the data frame, the ACK returning method and the like are described at the time of generating the data frame in step S213.

In step S214, the wireless transmission processing unit 141 transmits the data frame supplied from the spatial multiplex transmission processing unit 122 via the transmission-reception antenna control unit 143.

In step S215, the wireless transmission processing unit 141 determines whether or not the data frame has been transmitted up to the end. In a case where it is determined in step S215 that the data frame has not been transmitted up to the end, the processing returns to step S214, and the processing in step S214 and subsequent steps is repeated.

In a case where it is determined in step S215 that the data frame has been transmitted up to the end, the processing proceeds to step S216 in FIG. 23.

In step S216, the coordinate transmission-reception management unit 121 determines whether or not transmission of the BAR frame is necessary. In a case where it is determined in step S216 that the transmission of the BAR frame is necessary, the processing proceeds to step S217. The management information generation unit 124 generates the BAR frame under the control of the coordinate transmission-reception management unit 121.

In step S217, the wireless transmission processing unit 141 transmits the BAR frame supplied from the management information generation unit 124 via the transmission-reception antenna control unit 143. Thereafter, the processing proceeds to step S218.

In a case where it is determined in step S216 that the transmission of the BAR frame is not necessary, the processing in step S217 is skipped, and the processing proceeds to step S218.

In step S218, the management information processing unit 125 determines whether or not the ACK frame has been received.

The STA transmits the ACK frame (step S311 in FIG. 25, which will be described later). The wireless reception processing unit 145 outputs the ACK frame received by the transmission-reception antenna control unit 143 to the management information processing unit 125. In this case, it is determined in step S218 that the ACK has been received, and the processing proceeds to step S219.

In step S219, the management information processing unit 125 determines whether or not there is a designation to itself. For example, in a case where the destination is itself, or in a case where the address of itself is present in the Coordinate Address, it is determined in step S219 that itself is designated, and the processing proceeds to step S220. Note that information of another AP that performs coordinate transmission has been recognized, and thus ACK information thereof may also be acquired.

In step S220, the management information processing unit 125 acquires the ACK information from the ACK frame, and outputs the acquired ACK information to the coordinate transmission-reception management unit 121. Thereafter, the processing proceeds to step S221.

In a case where it is determined in step S218 that the ACK frame has not been received or in a case where it is determined in step S219 that there is no designation to itself, the processing similarly proceeds to step S221.

In step S221, the management information processing unit 125 determines whether or not there is non-delivery of the ACK frame on the basis of the ACK information. In a case where it is determined in step S220 that there is non-delivery of the ACK frame, the processing returns to step S216, and the processing in step S216 and subsequent steps is repeated.

In a case where it is determined in step S221 that there is no non-delivery of the ACK frame, the processing proceeds to step S222 in FIG. 24.

In step S222, the coordinate transmission-reception management unit 121 determines whether or not there is undelivered data that has not reached the STA on the basis of the ACK information supplied from the management information processing unit 125. In a case where it is determined in step S222 that there is undelivered data, the processing proceeds to step S223.

In step S223, the coordinate transmission-reception management unit 121 waits until it is determined that the retransmission possible time has come. In a case where it is determined in step S223 that the retransmission possible time has come, the processing proceeds to step S224.

In step S224, the spatial multiplex transmission processing unit 122 generates a retransmission frame using the data frame generated by the transmission frame construction unit 104 under the control of the coordinate transmission-reception management unit 121.

In step S225, the coordinate transmission-reception management unit 121 determines whether or not it is the AP as the coordinator. In a case where it is determined in step S225 that it is the AP as the coordinator, the processing proceeds to step S226.

In step S226, the management information generation unit 124 transmits the trigger frame for retransmission under the control of the coordinate transmission-reception management unit 121.

Furthermore, in a case where it is determined in step S225 that it is not the AP as the coordinator, the processing proceeds to step S227.

In step S227, the management information processing unit 125 waits until it is determined that the trigger frame for retransmission has been received.

In step S226 described above, the trigger frame for retransmission is transmitted from the AP as the coordinator. The wireless reception processing unit 145 outputs the trigger frame for retransmission received by the transmission-reception antenna control unit 143 to the management information processing unit 125. In this case, it is determined in step S227 that the trigger frame for retransmission has been received, and the processing proceeds to step S228.

In step S228, the spatial multiplex transmission processing unit 122 transmits the retransmission frame under the control of the coordinate transmission-reception management unit 121.

In step S229, the spatial multiplex transmission processing unit 122 determines whether or not the retransmission frame has been transmitted up to the end. In a case where it is determined in step S229 that the retransmission frame has not been transmitted up to the end, the processing returns to step S228, and the processing in step S228 and subsequent steps is repeated.

In a case where it is determined in step S229 that the retransmission frame has been transmitted up to the end, the processing returns to step S216 in FIG. 23, and the processing in step S216 and subsequent steps is repeated.

On the other hand, in a case where it is determined in step S222 that there is no undelivered data, the processing proceeds to step S230.

In step S230, the coordinate transmission-reception management unit 121 determines whether or not the AP is the AP as the coordinator. In a case where it is determined in step S230 that the AP is the AP as the coordinator, the processing proceeds to step S231.

In step S231, the management information generation unit 124 transmits the end frame under the control of the coordinate transmission-reception management unit 121. Thereafter, the processing proceeds to step S233.

On the other hand, in a case where it is determined in step S230 that the AP is not the AP as the coordinator, the processing proceeds to step S232.

In step S232, the management information processing unit 125 waits until it is determined that the end frame has been received.

In step S231 described above, the end frame is transmitted from the AP as the coordinator. The wireless reception processing unit 145 outputs the end frame received by the transmission-reception antenna control unit 143 to the management information processing unit 125. In this case, it is determined in step S232 that the end frame has been received, and the processing proceeds to step S233.

In step S233, the coordinate transmission-reception management unit 121 controls the network management unit 103 to discard the data accumulated in the transmission buffer 102. Thereafter, the processing of the AP is terminated.

<Operation of STA>

Figure 25:
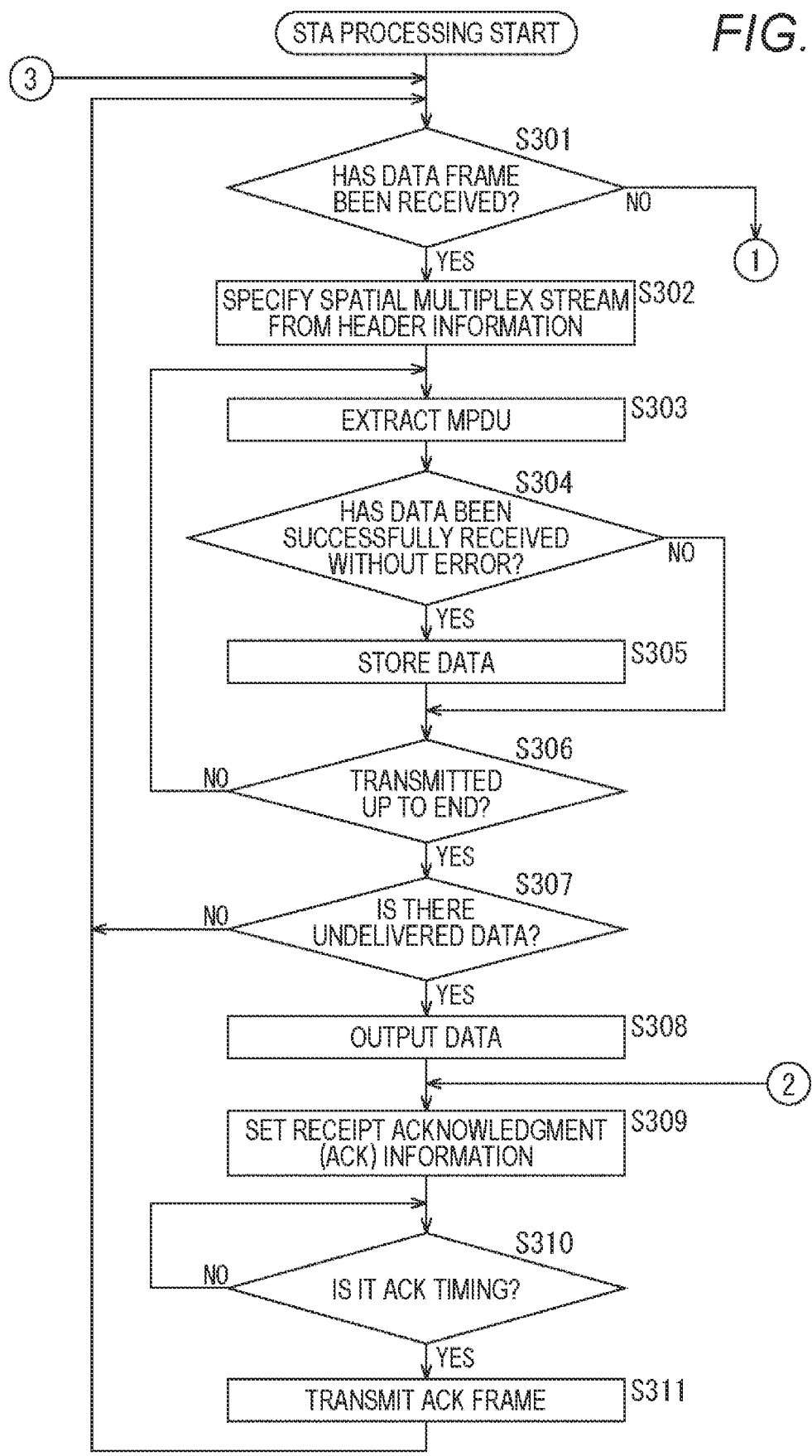
FIG. 25 is a flowchart describing processing of a communication device as an STA.
Figure 26:
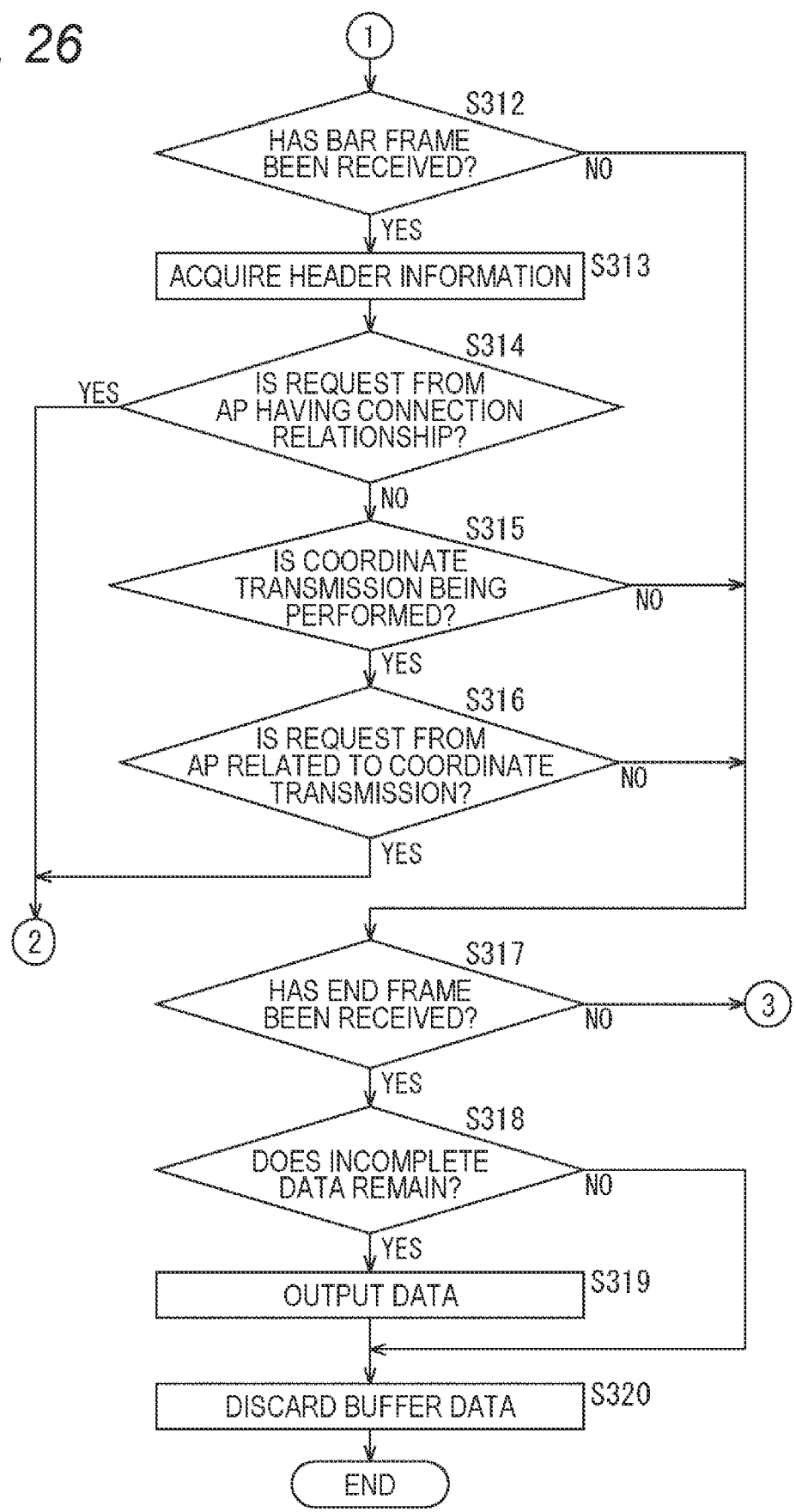
FIG. 26 is a flowchart describing processing of the communication device as the STA, following FIG. 25.

FIGS. 25 and 26 are flowcharts describing processing of the communication device 12 as the STA.

In step S301, the wireless reception processing unit 145 determines whether or not the data frame has been received. In a case where it is determined in step S301 that the data frame has been received, the processing proceeds to step S302.

In a case where the predetermined preamble signal is detected in the signal supplied from the transmission-reception antenna control unit 143, the wireless reception processing unit 145 separates individual streams and performs reception processing of the header and data to be added thereafter. The wireless reception processing unit 145 outputs the received header and data to the spatial multiplex reception processing unit 123 and the management information processing unit 125.

In step S302, the spatial multiplex reception processing unit 123 specifies a spatial multiplexing stream from the received header information.

In step S303, the reception data construction unit 105 removes predetermined header information from the data frame of the received A-MPDU and extracts the MPDU.

In step S304, the reception data construction unit 105 determines whether or not the data has been successfully received without an error. In a case where it is determined that the data has been successfully received without an error, the processing proceeds to step S305.

In step S305, the reception data construction unit 105 stores the data in the reception buffer 106. Thereafter, the processing proceeds to step S306.

In a case where it is determined in step S304 that the data has not been successfully received without an error, the processing in step S305 is skipped, and the processing proceeds to step S306.

In step S306, the reception data construction unit 105 determines whether or not the data frame has been received up to the end. In a case where it is determined in step S306 that the data frame has not been received up to the end, the processing returns to step S303, and the processing in step S303 and subsequent steps is repeated.

On the other hand, in a case where it is determined in step S306 that the data frame has been received up to the end, the processing proceeds to step S307.

In step S307, the reception data construction unit 105 determines whether or not there is undelivered data. In a case where it is determined in step S307 that there is undelivered data, the processing returns to step S301, and the processing in step S301 and subsequent steps is repeated.

On the other hand, in a case where it is determined in step S307 that there is no undelivered data, the processing proceeds to step S308.

In step S308, the reception data construction unit 105 outputs the data stored in the reception buffer 106 to the device control unit 53.

In step S309, the coordinate transmission-reception management unit 121 causes the management information generation unit 124 to set the receipt acknowledgment (ACK) information.

In step S310, the coordinate transmission-reception management unit 121 waits until it is determined that it is a timing of the ACK. In a case where it is determined that it is the timing of the ACK, the processing proceeds to step S311.

In step S311, the management information generation unit 124 outputs the ACK frame addressed to the AP having a connection relationship to the wireless transmission processing unit 141, thereby transmitting the ACK frame addressed to the AP having a connection relationship. Thereafter, the processing returns to step S301.

On the other hand, in a case where it is determined in step S301 that the data frame has not been received, the processing proceeds to step S312 in FIG. 26.

In step S312, the management information processing unit 125 determines whether or not the BAR frame has been received.

In step S217 of FIG. 23, the BAR frame is transmitted from the AP. The wireless reception processing unit 145 outputs the BAR frame received by the transmission-reception antenna control unit 143 to the management information processing unit 125. In this case, it is determined in step S312 that the BAR frame has been received on the basis of the header information of the frame received by the wireless reception processing unit 145, and the processing proceeds to step S313.

In step S313, the management information processing unit 125 acquires the header information and outputs the header information to the spatial multiplex reception processing unit 123.

In step S314, the spatial multiplex reception processing unit 123 determines whether or not the request is from the AP having a connection relationship (Associate AP) on the basis of the header information supplied from the management information processing unit 125. In a case where it is determined in step S314 that the request is from the AP having a connection relationship, the processing returns to step S309 in FIG. 25, and the processing in step S309 and subsequent steps is repeated.

In a case where it is determined in step S314 that the request is not from the AP having a connection relationship, the processing proceeds to step S315.

In step S315, the coordinate transmission-reception management unit 121 determines whether or not the coordinate transmission is being performed. In a case where it is determined in step S315 that the coordinate transmission is being performed, the processing proceeds to step S316.

In step S316, the spatial multiplex reception processing unit 123 determines whether or not the request is from the AP related to the coordinate transmission (for example, Coordinate AP) on the basis of the header information. In a case where it is determined in step S316 that the request is from the AP related to the coordinate transmission, the processing returns to step S309 in FIG. 25, and the processing in step S309 and subsequent steps is repeated.

In a case where it is determined in step S312 that the BAR frame has not been received, the processing proceeds to step S317.

In a case where it is determined in step S315 that the coordinate transmission is not being performed or in a case where it is determined in step S316 that the request is not from the AP related to the coordinate transmission, the processing similarly proceeds to step S317.

In step S317, the spatial multiplex reception processing unit 123 determines whether or not the end frame has been received.

In step S231 of FIG. 24, the end frame is transmitted from the AP as the coordinator. The wireless reception processing unit 145 outputs the end frame received by the transmission-reception antenna control unit 143 to the management information processing unit 125. In this case, it is determined in step S317 that the end frame is received on the basis of the header information of the frame received by the wireless reception processing unit 145, and the processing proceeds to step S318.

In step S318, the reception data construction unit 105 determines whether or not there remains incomplete data, which is data for which data has not been prepared, in the reception buffer 106. In a case where it is determined in step S318 that there remains the incomplete data, the processing proceeds to step S319.

In step S319, the reception buffer 106 outputs the data to the device control unit 53 via the interface unit 101. After the data is output, the processing proceeds to step S320.

In a case where it is determined in step S318 that there remains no incomplete data, the processing in step S319 is skipped, and the processing proceeds to step S320.

In step S320, the reception buffer 319 discards the buffer data. Thereafter, the processing of the STA ends.

In a case where it is determined in step S317 that the end frame has not been received, the processing returns to step S301 in FIG. 25, and the processing in step S301 and subsequent steps is repeated.

<<5. Others>>

<Conventional Art>

Conventionally, in a wireless LAN system, downlink multi-user multiplex communication is performed, and a method to which a DL MU MIMO technology is applied has been defined. Specifically, the method to which the DL MU MIMO technology is applied is a method of multiplexing each data stream and transmitting data from one AP to the plurality of STAs having a connection relationship with the AP.

On the other hand, with the spread of devices equipped with wireless LAN systems, other APs often exist around the AP itself.

Furthermore, a device has been put into practical use as a wireless LAN system in which a plurality of APs is arranged as one group in a home or office space to perform control to expand a signal reading range.

Moreover, a technology has also been devised for causing a plurality of APs to operate in cooperation and transmitting identical data from the plurality of APs to one STA, to thereby transmit data more reliably.

In this case, the wireless LAN system is configured to transmit the identical data from the plurality of APs to one STA. In this configuration, data transmission can be performed by setting a transmission parameter so that reception processing of the STA that receives data can be performed.

Patent Document 1 described above discloses a technique of constructing and transmitting data including a field signal (LTF). In this technique, in a case where the plurality of APs simultaneously transmits at the same frequency, the field signal includes information designating the stream to each STA.

Thus, when the Data 1 to the first STA belonging to the first AP and the Data 2 to the second STA belonging to the second AP are simultaneously transmitted from each AP, each STA can receive data even if each STA moves to a position where it is optimal to connect to another AP.

Currently, a frame aggregation technique is widely employed in wireless LAN systems in order to shorten a time required for access control. The frame aggregation technique is a technique of aggregating and transmitting a plurality of pieces of data.

In these wireless LAN systems, there has been used a technique of performing receipt acknowledgment to notify the transmission source of data that has been successfully received on the reception side. Furthermore, in these wireless LAN systems, control has been performed to retransmit, from the transmission side, data that has not been delivered on the reception side.

That is, because it is configured to perform the receipt acknowledgment of data that has been successfully received immediately after data transmission, in these wireless LAN systems, a technology of returning the receipt acknowledgment (ACK) frame after a minimum time interval (SIFS) has elapsed is used.

Furthermore, a technique capable of immediately identifying undelivered data by returning the block ACK frame for data transmitted using the frame aggregation technique is widely used.

However, in these wireless LAN systems, in a case where the identical data is simultaneously transmitted from a plurality of APs to the STA, the STA could not determine to which AP the receipt acknowledgment (ACK) from the STA should be returned.

Furthermore, in a place where any AP among the plurality of APs has failed to receive the receipt acknowledgment (ACK) from the STA, the retransmission of the data has been started from this AP regardless of that the STA has already received the data.

Moreover, in the configuration described in Patent Document 1, because data is transmitted from the plurality of APs to the plurality of STAs at the same timing, the STAs simultaneously transmit receipt acknowledgments immediately thereafter, and thus the receipt acknowledgment signals from the respective STAs collide with each other. Therefore, it has been difficult for the AP to correctly receive the signal of the receipt acknowledgment frame.

Furthermore, a configuration in which the signal of the receipt acknowledgment frame is collected from the plurality of STAs by applying an uplink multi-user MIMO technique is conceivable. However, because there is a plurality of APs to receive the receipt acknowledgment frame in each STA, the STA could not determine to which AP the transmission parameters should be set.

That is, if a certain STA does not know how to set a parameter of transmission power of the receipt acknowledgment frame and transmits all the parameters at the maximum transmission power, a collision with the receipt acknowledgment frame transmitted by another STA occurs, and the signal could not be decoded.

Moreover, in a case where there is data to be retransmitted, it has been difficult for the receiving STA to separate the retransmission data unless retransmission is performed while matching the data to be retransmitted with those of other APs.

Furthermore, in order to synchronize the transmission timing, there may be a case where the Master AP transmits the trigger frame and then perform retransmission. In this case, information of the receipt acknowledgment (ACK) frame received by each AP needs to be relayed and transmitted to the Master AP, and the Master AP has to specify data to be retransmitted.

Moreover, each AP needs to collect information of all the receipt acknowledgment frames sent from all the STAs and report the information to the Master AP, which complicates processing and increases the amount of data to be transmitted.

In such a configuration, it would be better if each AP is connected to the Master AP in a wired manner, but in a case where the APs are connected in a wireless manner, it is difficult to simultaneously collect data and it has been difficult to immediately transmit retransmission data after transmitting the trigger frame for retransmission.

Furthermore, in the AP for which the receipt acknowledgment frame from each STA has not been delivered, data to be retransmitted cannot be specified, and information could not be returned to the Master AP. In this case, the Master AP needs to request the receipt acknowledgment frame to the STA, and use efficiency of the transmission path has deteriorated.

Moreover, even in a case where data is received by all the STAs and retransmission is no longer necessary, the AP could not discard the data if the receipt acknowledgment has not been correctly received from the STA.

<Effects>

On the other hand, in the present technology, data addressed to the wireless communication terminals each including information indicating a transmission timing of a receipt acknowledgment of each of the plurality of wireless communication terminals is coordinately transmitted with one or more first other wireless communication devices, and a receipt acknowledgment is received from each of the wireless communication terminals after transmitting the data. Thus, a plurality of APs can efficiently collect the receipt acknowledgments of the respective STAs.

In a case where identical data is simultaneously transmitted from a plurality of APs to a plurality of STAs, a specific AP is used as a coordinator of retransmission control in coordinate transmission, and thus retransmission can be efficiently performed.

Because the AP as the coordinator determines retransmission, it is not necessary to transmit information of the receipt acknowledgment received by each AP to the Master AP, and retransmission can be efficiently performed.

By collecting the information of the receipt acknowledgment by the AP as the coordinator, it is possible to efficiently determine data that needs to be retransmitted.

In a case where the AP as the coordinator has failed to receive the receipt acknowledgment from a specific STA, information of the receipt acknowledgment of the STA can be efficiently collected by transmitting the block ACK request to the STA.

In a case where the AP as the coordinator has failed to receive the receipt acknowledgment from a specific STA, information of the receipt acknowledgment of the STA can be efficiently collected by transmitting the block ACK request to another AP.

As the return timing of the receipt acknowledgment, the timing immediately subsequent to the data transmission and a timing thereafter are designated, and thus the information of the receipt acknowledgment transmitted from each STA can be efficiently collected.

Because each AP can receive the receipt acknowledgment from each STA, data that needs to be retransmitted can be determined at an early stage.

In a case where there is undelivered receipt acknowledgment information, each AP transmits the block ACK request before the trigger for retransmission, so that each AP can reliably grasp undelivered data.

Because the AP as the coordinator transmits the end frame, it is possible to simultaneously notify all the communication devices such as the Master AP, other APs, and the STAs of the end of the coordinate transmission of data.

Each AP or STA can grasp the end of a series of data transmission in conjunction with the AP as the coordinator. That is, retransmission is not performed even if there is undelivered data, and thus it is possible to determine to discard a series of data collected in the past.

<Configuration Example of Computer>

The series of processes described above can be executed by hardware or can be executed by software. In a case where the series of processes is executed by software, a program constituting the software is installed on a computer built into dedicated hardware or a general-purpose personal computer, or the like from a program recording medium.

FIG. 27 is a block diagram illustrating a configuration example of hardware of a computer that executes the above-described series of processes by a program.

A central processing unit (CPU) 301, a read only memory (ROM) 302, and a random access memory (RAM) 303 are mutually connected by a bus 304.

An input-output interface 305 is further connected to the bus 304. An input unit 306 including a keyboard, a mouse, and the like, and an output unit 307 including a display, a speaker, and the like are connected to the input-output interface 305. Furthermore, a storage unit 308 including a hard disk, a nonvolatile memory, or the like, a communication unit 309 including a network interface or the like, and a drive 310 that drives a removable medium 311 are connected to the input-output interface 305.

In the computer configured as described above, for example, the CPU 301 loads a program stored in the storage unit 308 into the RAM 303 via the input-output interface 305 and the bus 304 and executes the program, to thereby perform the above-described series of processes.

The program to be executed by the CPU 301 is provided, for example, by being recorded in the removable medium 311 or via a wired or wireless transmission medium such as a local area network, the Internet, or digital broadcasting, and is installed in the storage unit 308.

Note that the program executed by the computer may be a program for processing in time series in the order described in the present description, or a program for processing in parallel or at a necessary timing such as when a call is made.

Note that in the present description, a system means a set of a plurality of components (devices, modules (parts), and the like), and it does not matter whether or not all the components are in the same housing. Therefore, both of a plurality of devices housed in separate housings and connected via a network and a single device in which a plurality of modules is housed in one housing are systems.

Furthermore, the effects described herein are merely examples and are not limited, and other effects may be provided.

The embodiments of the present technology are not limited to the above-described embodiments, and various modifications are possible without departing from the gist of the present technology.

For example, the present technology can employ a configuration of cloud computing in which one function is shared by a plurality of devices via a network and processed jointly.

Furthermore, each step described in the above-described flowcharts can be executed by one device, or can be executed in a shared manner by a plurality of devices.

Moreover, in a case where a plurality of processes is included in one step, the plurality of processes included in the one step can be executed in a shared manner by a plurality of devices in addition to being executed by one device.

<Example of Combinations of Configurations>

The present technology can also employ the following configurations.

(1)

A wireless communication device including:

a wireless transmission unit that coordinately transmits data addressed to wireless communication terminals with one or more first other wireless communication devices and transmits information indicating a transmission timing of a receipt acknowledgment of each piece of the data to the wireless communication terminals; and a wireless reception unit that receives a receipt acknowledgment from each of the wireless communication terminals after transmitting the data.

(2)

The wireless communication device according to (1) above, in which the receipt acknowledgment is a receipt acknowledgment addressed to one of the wireless communication device and the first other wireless communication device, and includes an address of a wireless communication device as a coordinator that controls coordinate transmission of the data among the wireless communication device and the first other wireless communication device.

(3)

The wireless communication device according to (1) or (2) above, further including a control unit that grasps a reception status of the data of each of the wireless communication terminals on the basis of the receipt acknowledgment in a case where the wireless communication device is a coordinator that controls the coordinate transmission of the data.

(4)

The wireless communication device according to (3) above, in which the control unit specifies retransmission data and generates a retransmission trigger including information for retransmitting the retransmission data, and the wireless transmission unit transmits the retransmission trigger and coordinately transmits the retransmission data with the first other wireless communication device.

(5)

The wireless communication device according to (4) above, in which
the control unit specifies the retransmission data on the basis of the receipt acknowledgment.

(6)

The wireless communication device according to (4) or (5) above, in which
the control unit generates a request for the receipt acknowledgment,
the wireless transmission unit transmits the request for the receipt acknowledgment, and
the wireless reception unit receives the receipt acknowledgment transmitted in response to the request for the receipt acknowledgment.

(7)

The wireless communication device according to (6) above, in which
the control unit starts transmission of the request for the receipt acknowledgment with a transmission waiting time shorter than a transmission waiting time of the retransmission trigger.

(8)

The wireless communication device according to (6) or (7) above, in which
the control unit generates a request addressed to the wireless communication terminals for retransmission of the receipt acknowledgment addressed to the other wireless communication device.

(9)

The wireless communication device according to any one of (6) to (8) above, in which
the control unit generates a request addressed to the first other wireless communication device for the receipt acknowledgment received by the first other wireless communication device.

(10)

The wireless communication device according to any one of (3) to (9) above, in which
the control unit generates an end frame indicating an end of transmission of the data in a case of receiving all the receipt acknowledgments from each of the wireless communication terminals or in a case of discarding the data, and
the wireless transmission unit transmits the end frame.

(11)

The wireless communication device according to any one of (3) to (10) above, in which
the wireless transmission unit transmits a transmission trigger that causes coordinate transmission of the data to the first other wireless communication device.

(12)

The wireless communication device according to any one of (3) to (10) above, in which
the control unit sets the wireless communication device as the coordinator in a case where the wireless communication device is designated as the coordinator by a second other wireless communication device.

(13)

The wireless communication device according to (1) or (2) above, in which
the wireless reception unit receives a retransmission trigger including information for retransmitting retransmission data, and
the wireless transmission unit coordinately transmits the retransmission data with the first other wireless communication device on the basis of information described in the retransmission trigger.

(14)

The wireless communication device according to (13) above, further including
a control unit that transmits the receipt acknowledgment addressed to the wireless communication device to the first other wireless communication device in a case where a request for the receipt acknowledgment transmitted from the first other wireless communication device is received.

(15)

The wireless communication device according to (14) above, in which
the control unit discards the data in a case of receiving an end frame indicating an end of transmission of the data.

(16)

A wireless communication method including:
by a wireless communication device,
coordinately transmitting data addressed to wireless communication terminals with one or more other wireless communication devices and transmitting information indicating a transmission timing of a receipt acknowledgment of each piece of the data to the wireless communication terminals; and
receiving a receipt acknowledgment from each of the wireless communication terminals after transmitting the data.

(17)

A wireless communication terminal including:
a wireless reception unit that receives data coordinately transmitted from a plurality of wireless communication devices and information indicating a transmission timing of a receipt acknowledgment;
a control unit that generates the receipt acknowledgment; and
a wireless transmission unit that transmits the receipt acknowledgment at the transmission timing.

(18)

The wireless communication terminal according to (17) above, in which
the control unit includes an address of a wireless communication device as a coordinator that controls the coordinate transmission of the data, and generates the receipt acknowledgment addressed to one of the plurality of wireless communication devices.

(19)

The wireless communication terminal according to (17) or (18) above, in which
the wireless transmission unit transmits the receipt acknowledgment to a first wireless communication device among the plurality of wireless communication devices, and transmits, in a case of receiving a request for the receipt acknowledgment transmitted from a second wireless communication device of the plurality of wireless communication devices, the receipt acknowledgment to the second wireless communication device.

(20)

The wireless communication terminal according to (17) or (19) above, in which
the control unit recognizes an end of transmission of the data on the basis of an end frame that is transmitted from any of the plurality of wireless communication devices and indicates an end of transmission of the data.

(21)
A wireless communication method including:
by a wireless communication terminal,
receiving data coordinately transmitted from a plurality of wireless communication devices and information indicating a transmission timing of a receipt acknowledgment;
generating the receipt acknowledgment; and
transmitting the receipt acknowledgment at the transmission timing.

REFERENCE SIGNS LIST

11, 11-1, 11-2 Communication device
12, 12-1, 12-2 Communication device
13 Communication device
51 Internet connection module
52 Information input module
53 Device control unit
54 Information output module
55 Wireless communication module
71 Software common unit
72 Coordinate transmission-reception unit
73 Baseband processing unit
74-1 to 74-4 Antenna
101 Interface unit
102 Transmission buffer
103 Network management unit
104 Transmission frame construction unit
105 Reception data construction unit
106 Reception buffer
121 Coordinate transmission-reception management unit
122 Spatial multiplex transmission processing unit
123 Spatial multiplex reception processing unit
124 Management information generation unit
125 Management information processing unit

The invention claimed is:

1. A first wireless communication device, comprising:
a wireless transmission unit configured to:
coordinately transmit data addressed to wireless communication terminals with a second wireless communication device; and
transmit information, indicating a transmission timing of a receipt acknowledgment of each piece of the transmitted data, to the wireless communication terminals;
a wireless reception unit configured to:
receive, after the coordinated transmission of the data, the receipt acknowledgment from each of the wireless communication terminals; and
receive a retransmission trigger including information for retransmission of retransmission data,
wherein the wireless transmission unit is further configured to coordinately transmit the retransmission data with the second wireless communication device based on the information of the retransmission trigger; and
a control unit configured to:
transmit the receipt acknowledgment, addressed to the first wireless communication device, to the second wireless communication device in a case where a first request for the receipt acknowledgment transmitted from the second wireless communication device is received.

2. The first wireless communication device according to claim 1, wherein the receipt acknowledgment includes an address of a specific wireless communication device as a coordinator that controls the coordinated transmission of the data among the first wireless communication device and the second wireless communication device.

3. The first wireless communication device according to claim 1, wherein the control unit is further configured to determine a reception status of the data of each of the wireless communication terminals based on the receipt acknowledgment, in a case where the first wireless communication device is a coordinator configured to control the coordinated transmission of the data.

4. The first wireless communication device according to claim 3, wherein
the control unit is further configured to:
generate the retransmission trigger that includes the information for the retransmission of the retransmission data, and
the wireless transmission unit is further configured to:
transmit the retransmission trigger; and
coordinately transmit the retransmission data with the second wireless communication device to the wireless communication terminals.

5. The first wireless communication device according to claim 4, wherein
the control unit is further configured to generate a second request for the receipt acknowledgment,
the wireless transmission unit is further configured to transmit the second request for the receipt acknowledgment, and
the wireless reception unit is further configured to receive, the receipt acknowledgment transmitted, based on the second request for the receipt acknowledgment.

6. The first wireless communication device according to claim 5, wherein the control unit is further configured to start the transmission of the second request for the receipt acknowledgment with a transmission waiting time shorter than a transmission waiting time of the retransmission trigger.

7. The first wireless communication device according to claim 5, wherein the control unit is further configured to generate a third request addressed to the wireless communication terminals for retransmission of the receipt acknowledgment addressed to the second wireless communication device.

8. The first wireless communication device according to claim 5, wherein the control unit is further configured to generate a fourth request addressed to the second wireless communication device for retransmission of the receipt acknowledgment received by the second wireless communication device.

9. The first wireless communication device according to claim 3, wherein
the control unit is further configured to generate an end frame indicating an end of the coordinated transmission of the data in a case of receipt of all receipt acknowledgments from each of the wireless communication terminals or in a case where the data is discarded, and
the wireless transmission unit is further configured to transmit the end frame.

10. The first wireless communication device according to claim 3, wherein the wireless transmission unit is further configured to transmit a transmission trigger that causes the coordinated transmission of the data to the second wireless communication device.

11. The first wireless communication device according to claim 3, wherein the control unit is further configured to set the first wireless communication device as the coordinator in a case where the first wireless communication device is designated as the coordinator by a third wireless communication device.

12. The first wireless communication device according to claim 1, wherein the control unit is further configured to discard the data in a case of receipt of an end frame indicating an end of the coordinated transmission of the data.

13. A wireless communication method, comprising:
coordinately transmitting data addressed to wireless communication terminals with a first wireless communication device;
transmitting information, indicating a transmission timing of a receipt acknowledgment of each piece of the transmitted data, to the wireless communication terminals;
receiving, after the coordinated transmitting of the data, the receipt acknowledgment from each of the wireless communication terminals;
receiving a retransmission trigger including information for retransmitting retransmission data;
coordinately transmitting the retransmission data with the first wireless communication device based on the information of the retransmission trigger; and
transmitting the receipt acknowledgment, addressed to a second wireless communication device, to the first wireless communication device in a case where a request for the receipt acknowledgment transmitted from the first wireless communication device is received.

14. A wireless communication terminal, comprising:
a wireless reception unit configured to:
  receive data coordinately transmitted from a plurality of wireless communication devices and information indicating a transmission timing of a receipt acknowledgment;
  receive a retransmission trigger including information for retransmission of retransmission data; and
  receive the retransmission data coordinately transmitted from the plurality of wireless communication devices, wherein the coordinated transmission of the retransmission data is based on the information of the retransmission trigger;
a control unit configured to:
  generate the receipt acknowledgment of each piece of the received data; and
  generate the receipt acknowledgement addressed to a first wireless communication device of the plurality of wireless communication devices in a case where a retransmission of the receipt acknowledgement is requested by the first wireless communication device; and
a wireless transmission unit configured to transmit the receipt acknowledgment at the transmission timing.

15. The wireless communication terminal according to claim 14, wherein the receipt acknowledgment includes an address of the first wireless communication device of the plurality of wireless communication devices as a coordinator that controls the coordinated transmission of the data.

16. The wireless communication terminal according to claim 14, wherein the wireless transmission unit is further configured to:
transmit the receipt acknowledgment to the first wireless communication device among the plurality of wireless communication devices, and
transmit, in a case of receipt of a request for the receipt acknowledgment transmitted from a second wireless communication device of the plurality of wireless communication devices, the receipt acknowledgment to the second wireless communication device.

17. The wireless communication terminal according to claim 14, wherein the control unit is further configured to:
recognize, based on an end frame that is transmitted from one of the plurality of wireless communication devices, an end of the coordinated transmission of the data; and
indicate the end of the coordinated transmission of the data.

18. A wireless communication method, comprising:
receiving data coordinately transmitted from a plurality of wireless communication devices and information indicating a transmission timing of a receipt acknowledgment;
receiving a retransmission trigger including information for retransmission of retransmission data;
receiving the retransmission data coordinately transmitted from the plurality of wireless communication devices, wherein the coordinated transmission of the retransmission data is based on the information of the retransmission trigger;
generating the receipt acknowledgment of each piece of the received data;
generating the receipt acknowledgement addressed to a wireless communication device of the plurality of wireless communication devices in a case where a retransmission of the receipt acknowledgement is requested by the wireless communication device; and
transmitting the receipt acknowledgment at the transmission timing.

* * * * *